United States Patent
Anagawa et al.

(10) Patent No.: US 7,961,428 B2
(45) Date of Patent: Jun. 14, 2011

(54) THIN-FILM MAGNETIC HEAD HAVING MAGNETIC LAYER WITH NON-MAGNETIC LAYER THEREWITHIN

(75) Inventors: Kenkichi Anagawa, Tokyo (JP); Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 1021 days.

(21) Appl. No.: 11/769,497

(22) Filed: Jun. 27, 2007

(65) Prior Publication Data

US 2008/0013210 A1    Jan. 17, 2008

(30) Foreign Application Priority Data

Jul. 4, 2006  (JP) ................. 2006-184563
Oct. 13, 2006  (JP) ................. 2006-279946

(51) Int. Cl.
G11B 5/31    (2006.01)
(52) U.S. Cl. .................................... 360/125
(58) Field of Classification Search .............. None
See application file for complete search history.

(56) References Cited

U.S. PATENT DOCUMENTS

| | | | |
|---|---|---|---|
| 6,469,868 B2 * | 10/2002 | Yamamoto et al. | 360/125.71 |
| 6,490,126 B1 | 12/2002 | Sasaki | |
| 6,646,828 B1 | 11/2003 | Sasaki | |
| 7,503,107 B2 * | 3/2009 | Koyama et al. | 29/603.18 |
| 7,684,150 B2 * | 3/2010 | Pokhil et al. | 360/125.57 |
| 2002/0008936 A1 * | 1/2002 | Kawasaki et al. | 360/126 |
| 2002/0041464 A1 * | 4/2002 | Yamamoto et al. | 360/126 |
| 2003/0048581 A1 * | 3/2003 | Ohtomo et al. | 360/126 |
| 2006/0002021 A1 * | 1/2006 | Li et al. | 360/126 |

FOREIGN PATENT DOCUMENTS

| | | |
|---|---|---|
| JP | A-08-102013 | 4/1996 |
| JP | A-11-025419 | 1/1999 |

* cited by examiner

Primary Examiner — Mark Blouin
(74) Attorney, Agent, or Firm — Oliff & Berridge, PLC

(57) ABSTRACT

Provided is a thin-film magnetic having improved write characteristics in the high-frequency band. The head comprises an electromagnetic coil element comprising upper and lower magnetic layers, a write gap layer and a write coil layer, and in the electromagnetic coil element, at least one non-magnetic layer is provided within the upper magnetic layer, and further, an upper surface, a lower surface, at least a portion of a front surface and at least a portion of a rear surface of the non-magnetic layer are covered with magnetic material of at least one of the upper magnetic layer and the lower magnetic layer.

33 Claims, 13 Drawing Sheets

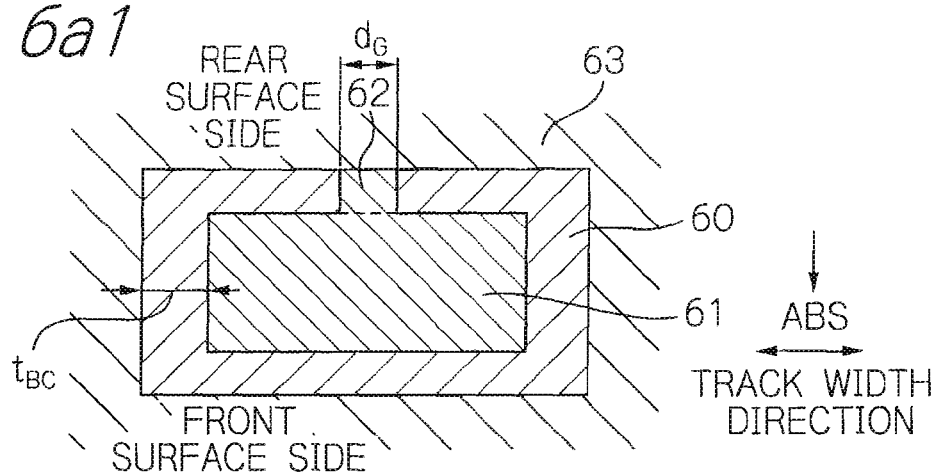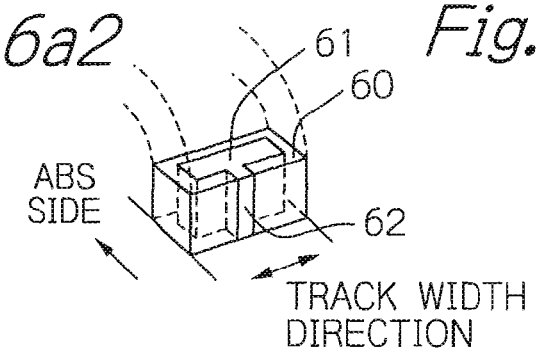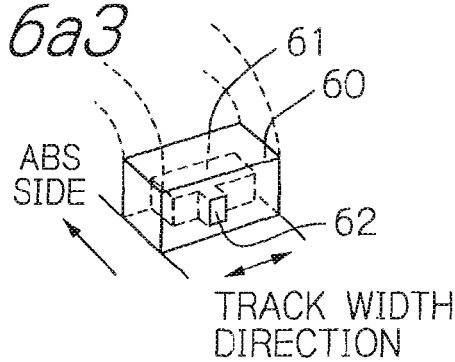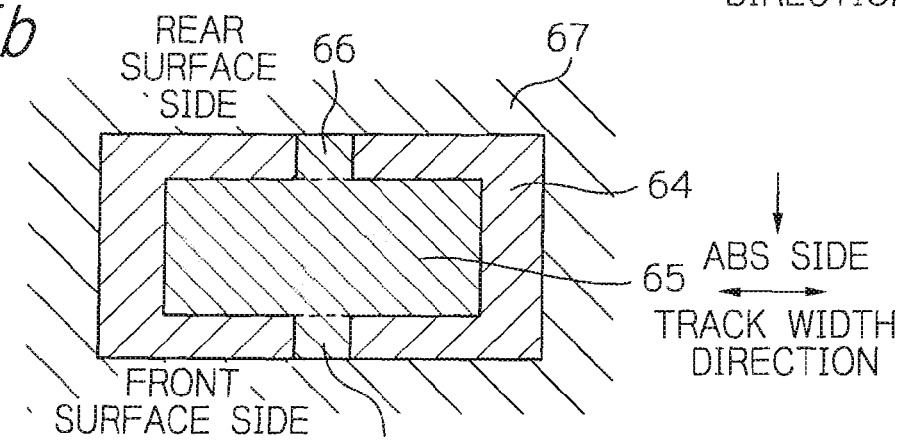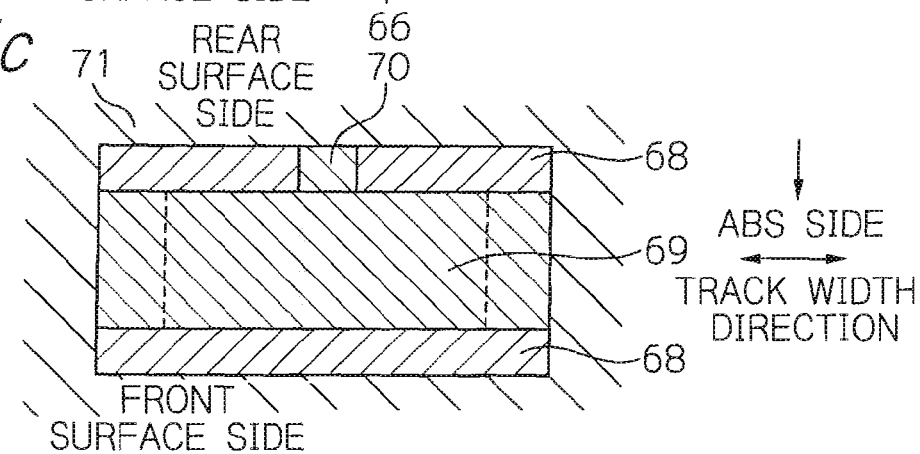

PRACTICAL EXAMPLE 1

PRACTICAL EXAMPLE 2

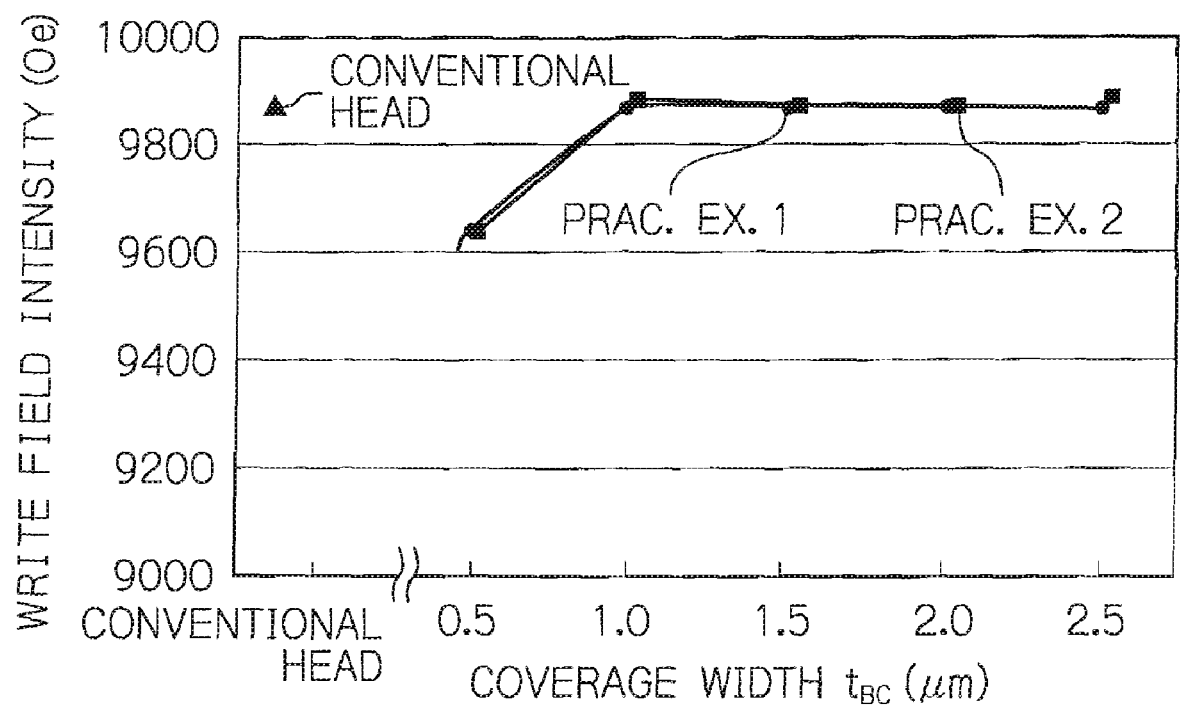

DISTRIBUTION OF EDDY-CURRENT LOSS

DISTRIBUTION OF EDDY-CURRENT LOSS

THIN-FILM MAGNETIC HEAD HAVING MAGNETIC LAYER WITH NON-MAGNETIC LAYER THEREWITHIN

PRIORITY CLAIM

This application claims priorities from Japanese patent application No. 2006-184563, filed on Jul. 4, 2006 and Japanese patent application No. 2006-279946, filed on Oct. 13, 2006, which are incorporated herein by reference.

BACKGROUND OF THE INVENTION

1. Field of the Invention

The present invention relates to a thin-film magnetic head for magnetic recording including an electromagnetic coil element having a magnetic layer with a non-magnetic layer therewithin, a head gimbal assembly (HGA) provided with the thin-film magnetic head, and a magnetic disk drive apparatus provided with the HGA.

2. Description of the Related Art

With the increasing demand for small, and yet high-capacity magnetic disk drive apparatus in recent years, further improvements in recording density have become essential. One of the important factors for increasing recording density is an improvement in write characteristics of thin-film magnetic heads in the high-frequency band of data signal, which includes the maintenance or improvement of the write field intensity.

Generally, an electromagnetic coil element for writing data signals of the thin-film magnetic head has, in the case that the head is for longitudinal magnetic recording, a lower magnetic layer (a magnetic layer on the leading side) and an upper magnetic layer (a magnetic layer on the trailing side) that sandwich a write gap layer. These magnetic layers act as magnetic poles. In such a head, the improvement of the write characteristics in the high-frequency band requires eddy-current loss generated in the magnetic layers to be suppressed, as well as requires an adequate soft-magnetic material to constitute the magnetic layers. The eddy-current loss increases as data signals have higher frequency, and causes the write characteristics to be degraded by disturbing the response of the magnetization of the magnetic layers to the signal field.

A technique for suppressing the eddy-current loss is disclosed, for example, in Japanese Patent Publication 08-102013A, in which the portion of an upper core and/or lower core other than the portion overlapping with a front intermediate core has a multilayered structure in which a non-magnetic insulating layer is sandwiched between magnetic layers. The non-magnetic insulating layer is intended to decrease the eddy-current loss, and further, to realize a flat frequency characteristic because the non-magnetic insulating layer is not formed in the portion overlapping with the front intermediate core and is not exposed from the opposed-to-medium surface, and therefore does not contribute to the formation of pseudo-gap.

Further, Japanese Patent Publication 11-25419A discloses a thin-film magnetic head having an upper core in which a first magnetic film, non-magnetic insulating film and a second magnetic film are sequentially stacked. In the head, the thickness of the non-magnetic insulating film is set to be less than 50 nm (nanometers) and to be one tenth of the magnetic gap or less so as to suppress eddy-current loss and further magnetic flux leakage due to the interposition of the non-magnetic insulating film.

However, even using the above-described conventional techniques utilizing the non-magnetic insulating layer (film) within the core in a certain form, there has been a problem that sufficient write characteristics in the high-frequency band is difficult to be obtained. That is to say, there has been a problem of the difficulty in obtaining sufficient write field intensity, of the occurrence of adjacent track erase (ATE), of the increase in thermal pole tip protrusion (TPTP) due to write currents, and further of the increase in non-linear transition shift (NLTS).

Actually, in the thin-film magnetic head described in Japanese Patent Publication 08-102013A, the non-magnetic insulating layer exists in the portion other than the portion overlapping with the front intermediate core, and therefore, reaches the end on the side opposite to the opposed-to-medium surface of the upper core and/or lower core. As a result, a magnetic flux leaks out from the end, which reduces the intensity of the essential write field in the write gap position.

Also, the technique described in Japanese Patent Publication 11-25419A has the same problem, in which the non-magnetic insulating layer can reach the end on the opposed-to-medium surface side, as well as the end on the side opposite to the opposed-to-medium surface. In the technique, the thickness of the non-magnetic insulating layer is adjusted to deal with this magnetic flux leakage problem, however, the case may occur that such thin-film magnetic heads cannot sufficiently corresponds to further miniaturization and higher frequency of data signals.

Moreover, the technique requires that the saturation magnetic flux density of the first magnetic film is set higher than that of the second magnetic flux density, which restricts the design of the magnetic circuit.

In addition, suppressing the ATE, suppressing the TPTP due to write currents and reducing the NLTS, as well as improving the write field intensity, are important points to solve the problem of the write characteristics in the high-frequency band.

Here, the ATE is a phenomenon in which unwanted write or erase operation is performed to the adjacent track on the magnetic disk as a magnetic recording medium due to the increased influence of the leakage field from a magnetic pole, under the condition that the width in the track width direction of the magnetic pole becomes smaller according to higher frequency of data signals. The TPTP due to write currents is a phenomenon in which the end of the magnetic head element is protruded toward the surface of the magnetic disk due to such as Joule heat from the coil layer and heat of eddy-current loss in the magnetic poles and shields (magnetic layers), both of which are generated by applying write currents to the coil layer. When the end of the magnetic head element has a contact with the surface of the magnetic disk due to the TPTP, the frictional heat by the contact causes the electric resistance of a magnetoresistive (MR) effect element for reading data signals to be changed, so that a problem (thermal asperity) such as the occurrence of abnormal signals is likely to occur, and further, the probability of crash becomes high.

The NLTS is a shift in time of read signals, which is caused by the shift in the position of the magnetization reverse in the record bit during writing, generated by the influence of the magnetization of existing record bits. The increase in the NLTS has a possibility to bring a negative effect to the demodulation of data signals.

However, the above-described conventional techniques just utilizing the non-magnetic insulating layer (film) within the core have had no consideration for suppressing/reducing these phenomena.

BRIEF SUMMARY OF THE INVENTION

Therefore, an object of the present invention is to provide a thin-film magnetic head having improved write characteristics in the high-frequency band, an HGA provided with the thin-film magnetic head, and a magnetic disk drive apparatus provided with the HGA.

Before describing the present invention, terms used herein will be defined. In a multilayer structure formed on/above an element formation surface of a substrate in the magnetic head element, a layer or a portion of the layer located on the substrate side in relation to a standard layer is referred to as being located "lower" than, "beneath" or "below" the standard layer, and a layer or a portion of the layer located on the stacking direction side in relation to a standard layer is referred to as being located "upper" than, "on" or "above" the standard layer. Especially, in a non-magnetic layer provided within the magnetic layer according to the present invention, the surfaces of the non-magnetic layer positioned between the "upper surface" and "lower surface" of the non-magnetic layer and opposed to each other in the track width direction is referred to as being "side surfaces". The surface of the non-magnetic layer on the air bearing surface (ABS) side positioned between the "upper surface" and "lower surface" is referred to as being "front surface". Further, the surface of the non-magnetic layer on the side opposite to the ABS positioned between the "upper surface" and "lower surface" is referred to as being "rear surface".

According to the present invention, a thin-film magnetic head is provided, which comprises an electromagnetic coil element comprising: an upper magnetic layer and a lower magnetic layer, formed on an element formation surface of a substrate having an ABS; a write gap layer, an end portion on the ABS side of the write gap layer sandwiched between the upper magnetic layer and the lower magnetic layer; and a write coil layer passing through at least between the upper magnetic layer and the lower magnetic layer, at least one non-magnetic layer provided within the upper magnetic layer, and an upper surface, a lower surface, at least a portion of a front surface and at least a portion of a rear surface of the non-magnetic layer, covered with magnetic material of at least one of the upper magnetic layer and the lower magnetic layer.

Here, the configuration described by "at least a portion of a front (rear) surface . . . covered with . . . " includes the case that the front (rear) surface is wholly covered, for example, as the cases of the non-magnetic layers shown in FIGS. 3b and 4a, and also includes the case that a portion of the front (rear) surface is exposed from the magnetic layer (connected to external non-magnetic region), for example, as the cases of the non-magnetic layers shown in FIGS. 6a1 to 6c.

In the above-described thin-film magnetic head according to the present invention, providing the above-described non-magnetic layer causes the generation of an eddy-current in the upper magnetic layer to be suppressed, which drastically reduces the eddy-current loss and improves the magnetic permeability. Further, because at least the lower surface, the upper surface, the front surface and the rear surface are covered with magnetic material, the magnetic flux in the upper and lower magnetic layers does not receive significant resistance, which suppresses the leakage of the magnetic flux. As a result, the write characteristics in the high-frequency band are improved. Especially in the write characteristics, the sufficient write field intensity is maintained, the ATE and the TPTP due to write currents are suppressed, or the NLTS is reduced.

Further, in the above-described thin-film magnetic head according to the present invention, at least surfaces other than both side surfaces of the non-magnetic layer are preferably covered with magnetic material of at least one of the upper magnetic layer and the lower magnetic layer. Also, it is preferable that the non-magnetic layer is wholly covered with magnetic material of at least one of the upper magnetic layer and the lower magnetic layer. In these cases, the leakage of magnetic field can be more suppressed.

Further, in the above-described thin-film magnetic head according to the present invention, a portion of the front surface, a portion of the rear surface or portions of both side surfaces of the non-magnetic layer is preferably connected to a non-magnetic region covering the upper magnetic layer. In the case, only a portion of the rear surface of the non-magnetic layer is also preferably connected to a non-magnetic region covering the upper magnetic layer. Further in the case, it is also preferable that the upper magnetic layer has a gap in an end portion thereof on the side opposite to the ABS, on a cross-section parallel to the element formation surface of the non-magnetic layer, and the upper magnetic layer surrounds the non-magnetic layer except the gap. Providing the gap causes the formation of loop current circuit surrounding the non-magnetic layer to be prevented, which reduces the eddy-current in the upper magnetic layer.

Further, in the above-described thin-film magnetic head according to the present invention, it is preferable that the upper magnetic layer comprises; an upper magnetic pole layer whose lower surface is in contact with a surface of the write gap layer; a back-contact magnetic pole layer whose lower surface is in contact with a surface of the lower magnetic layer; and an upper yoke layer whose end portion on the ABS side is in contact with a surface of the upper magnetic pole layer and whose end portion opposite to the end portion on the ABS side is in contact with a surface of the back-contact magnetic pole layer, and the non-magnetic layer is provided within the back-contact magnetic pole layer. In the case, the coverage width $t_{BC}$ defined as a thickness of the magnetic material portion covering the non-magnetic layer in the direction in-plane of the element formation surface, is more preferably set to be at least 1 µm (micrometer) or more. The coverage width $t_{BC}$ of 1 µm or more sufficiently holds the write field intensity, compared to the conventional head.

Furthermore, in the above-described thin-film magnetic head according to the present invention, it is preferable that the upper magnetic layer comprises; an upper magnetic pole layer whose lower surface is in contact with a surface of the write gap layer; and an upper yoke layer whose end portion on the ABS side is in contact with a surface of the upper magnetic pole layer, and the non-magnetic layer is provided within the upper yoke layer. Further, the non-magnetic layer is also preferably provided within both the back-contact magnetic pole layer the upper yoke layer.

According to the present invention, a thin-film magnetic head is further provided, which comprises an electromagnetic coil element comprising: a main magnetic pole layer formed on an element formation surface of a substrate having an ABS; a back-contact magnetic pole layer, a lower surface of the back-contact magnetic pole layer being in contact with a surface of the main magnetic pole layer, an auxiliary magnetic pole layer, an end portion of the auxiliary magnetic pole layer on the ABS side being opposed to an end portion on the ABS side of the main magnetic pole layer, and an end portion opposite to the end portion on the ABS side being in contact with a surface of the back-contact magnetic pole layer; and a write coil layer passing through at least between the main magnetic pole layer and the auxiliary magnetic pole layer, at least one non-magnetic layer provided within a layer region constituted by the main magnetic pole layer and the back-contact magnetic pole layer, and an upper surface, a lower surface, at least a portion of a front surface and at least a portion of a rear surface of the non-magnetic layer, covered with magnetic material of at least one of the main magnetic pole layer, the back-contact magnetic pole layer and the auxiliary magnetic pole layer.

In the above-described thin-film magnetic head according to the present invention, at least surfaces other than both side surfaces of the non-magnetic layer are preferably covered with magnetic material of at least one of the main magnetic pole layer, the back-contact magnetic pole layer and the auxiliary magnetic pole layer. Further, it is also preferable that the non-magnetic layer is wholly covered with magnetic material of at least one of the main magnetic pole layer, the back-contact magnetic pole layer and the auxiliary magnetic pole layer.

Further, in the above-described thin-film magnetic head according to the present invention, a portion of the front surface, a portion of the rear surface or portions of both side surfaces of the non-magnetic layer is preferably connected to a non-magnetic region covering the main magnetic pole layer or the back-contact magnetic pole layer. In the case, only a portion of the rear surface of the non-magnetic layer is more preferably connected to a non-magnetic region covering the main magnetic pole layer or the back-contact magnetic pole layer. Further, it is also more preferable that the main magnetic pole layer or the back-contact magnetic pole layer has a gap in an end portion thereof on the side opposite to the ABS, on a cross-section parallel to the element formation surface of the non-magnetic layer, and the main magnetic pole layer or the back-contact magnetic pole layer surrounds the non-magnetic layer except the gap.

As described above, the structure with the non-magnetic layer according to the present invention can be applied to the head for perpendicular magnetic recording, as well as for longitudinal magnetic recording.

In either head for perpendicular or longitudinal magnetic recording, the non-magnetic layer is preferably formed of a non-magnetic and electrically insulating material. In the case, the generation of the eddy-current is more suppressed, which reduces the eddy-current loss and improves the permeability.

According to the present invention, an HGA is further provided, which comprises the above-described thin-film magnetic head and a support mechanism for supporting the thin-film magnetic head.

According to the present invention, a magnetic disk drive apparatus is further provided, which comprises: at least one HGA described above; at least one magnetic recording medium; and a recording/reproducing means for controlling read and write operations of the thin-film magnetic head to the at least one magnetic recording medium.

The above-described thin-film magnetic head, HGA and magnetic disk drive apparatus according to the present invention can show improved write characteristics in the high-frequency band. As a result, excellent recording/reproducing characteristics can be obtained under the condition of higher recording density.

Further objects and advantages of the present invention will be apparent from the following description of preferred embodiments of the invention as illustrated in the accompanying figures. In each figure, the same element as that shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIGS. 6a1 to 6c show cross-sectional views and perspective views illustrating other embodiments of the thin-film magnetic head having the back-contact magnetic pole layer with the non-magnetic layer therewithin;

FIG. 8 shows a graph illustrating the relations between the coverage width $t_{BC}$ of the back-contact magnetic pole layer and the write field intensity in the heads of practical examples and the conventional head;

DETAILED DESCRIPTION OF THE INVENTION

Figure 1:
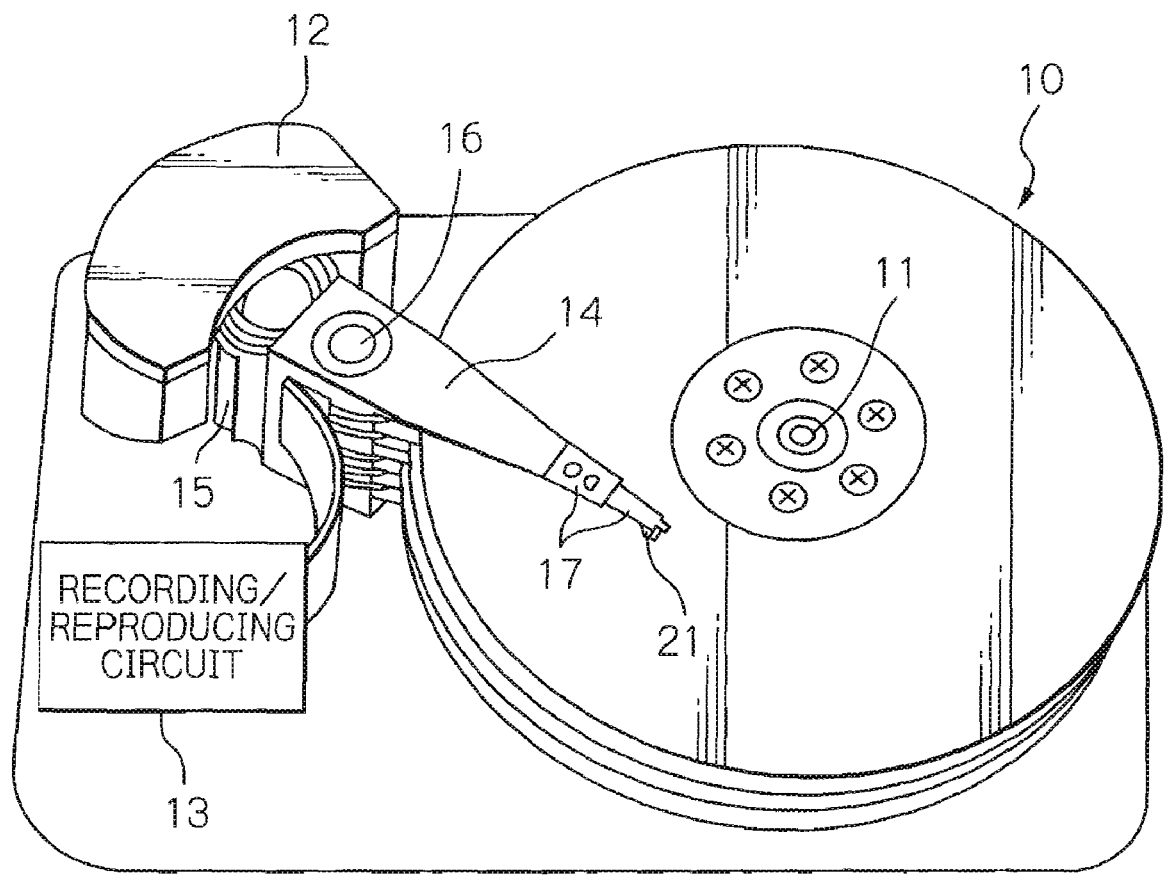
FIG. 1 shows a perspective view schematically illustrating a configuration of a main portion of an embodiment of the magnetic disk drive apparatus according to the present invention.

FIG. 1 shows a perspective view schematically illustrating a configuration of a main portion of an embodiment of the magnetic disk drive apparatus according to the present invention.

In FIG. 1, reference numeral 10 denotes multiple magnetic disks that rotate about the spindle of a spindle motor 11, 12 denotes an assembly carriage device for positioning a thin-film magnetic head (slider) 21 above a track, and 13 denotes a recording/reproducing circuit for controlling read/write operations of the thin-film magnetic head.

The assembly carriage device 12 is provided with multiple drive arms 14. The drive arms 14 are capable of angular-pivoting about a pivot bearing axis 16 driven by a voice coil motor (VCM) 15 and are stacked along the axis 16. An HGA 17 is attached in the end of each drive arm 14. Each HGA 17 is provided with a thin-film magnetic head (slider) 21 in such a manner that the slider 21 faces the surface of each magnetic disk 10. The numbers of magnetic disks 10, drive arms 14, HGAs 17, and sliders 21 may be one.

While not shown in the figure, the recording/reproducing circuit 13 includes a recording/reproducing control LSI, a write gate for receiving record data from the recording/reproducing control LSI, a write circuit for outputting signals from the write gate to an electromagnetic coil element for writing, which will be described later, a constant current circuit for supplying a sense current to an MR effect element for reading, which will also be described later, an amplifier for amplifying an element output voltage from the MR effect element, and a demodulator circuit for outputting reproduced data to the recording/reproducing control LSI.

Figure 2:
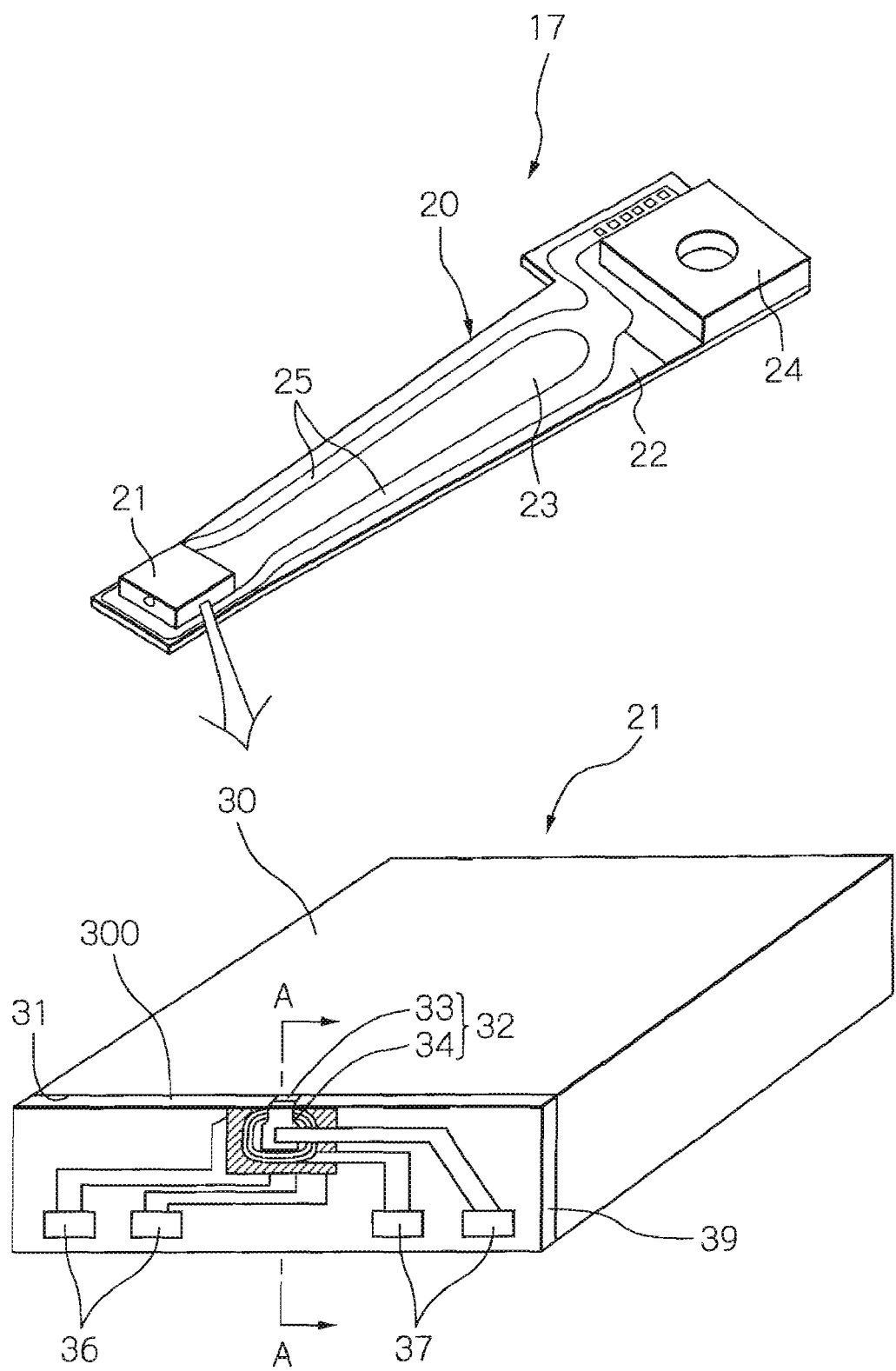
FIG. 2 shows a perspective view illustrating an embodiment of the HGA according to the present invention and the thin-film magnetic head (slider) attached on the end of the HGA.

FIG. 2 shows a perspective view illustrating an embodiment of the HGA according to the present invention and the thin-film magnetic head (slider) attached on the end of the HGA.

As shown in FIG. 2, the HGA 17 is constituted by fixing the slider 21 that has a magnetic head element on the end portion of a suspension 20 as a supporting means and by electrically connecting one end of a wiring member 25 to signal electrodes of the slider 21.

The suspension 20 includes a load beam 22, an flexure 23 with elasticity fixed on and supported by the load beam 22, a base plate 24 provided on the base portion of the load beam 22, and a wiring member 25 which is provided on the flexure 23 and consists of lead conductors and connection pads electrically connected to both ends of the lead conductors. While not shown in the figure, a head drive IC chip may be attached at some midpoint of the suspension 20.

Also in FIG. 2, the thin-film magnetic head (slider) 21 includes a slider substrate 210 having an ABS 30 processed so as to provide an appropriate flying height and an element formation surface 31, a magnetic head element 32 formed on/above the element formation surface 31, and pairs of signal electrodes 36 and 37 exposed in the surface of an overcoat layer 39 formed on the element formation surface 31. The magnetic head element 32 includes an MR effect element 33 for reading data and an electromagnetic coil element 34 for writing data. The signal electrodes 36 and 37 are connected to the MR effect element 33 and the electromagnetic coil element 34, respectively.

One end of each of the MR effect element 33 and the electromagnetic coil element 34 extends to the head end surface 300 on the ABS 30 side. These ends face a magnetic disk, and then, sense a signal field from the magnetic disk to read data, and apply a signal field to the disk to write data.

Figure 3A:
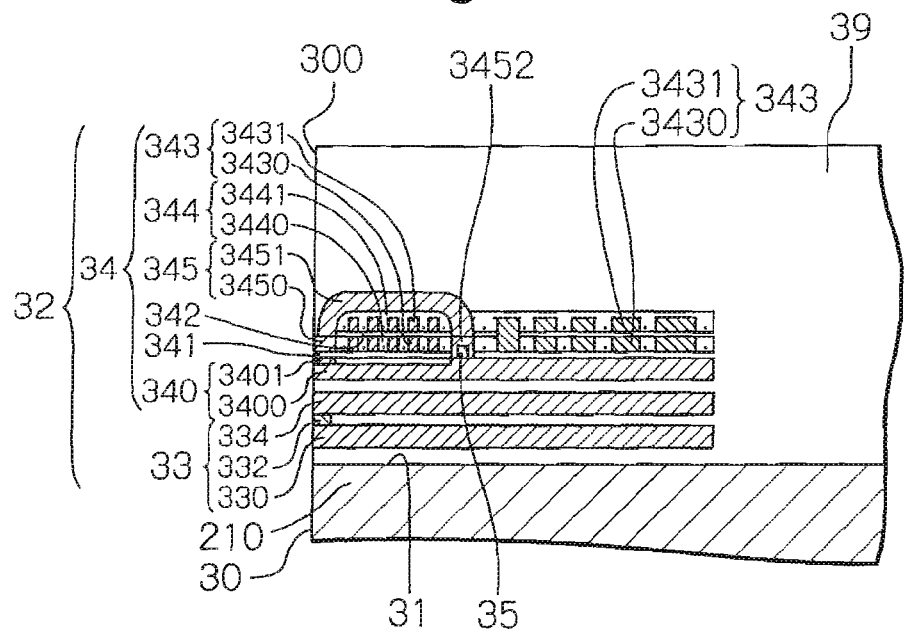
FIG. 3a shows a cross-sectional view taken along line A-A in FIG. 2, illustrating a configuration of a main portion of the thin-film magnetic head according to the present invention.
Figure 3B:
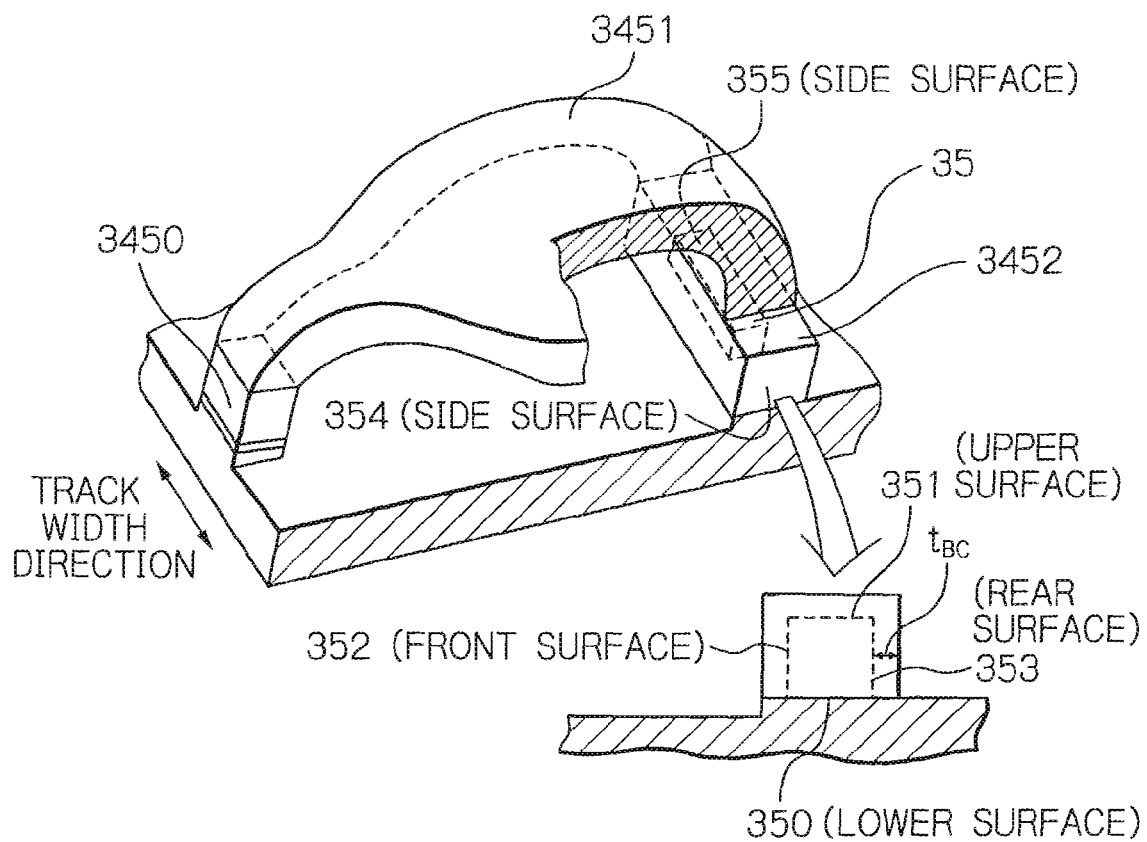
FIG. 3b shows a perspective view illustrating a configuration of a main portion of the electromagnetic coil element in the thin-film magnetic head.

FIG. 3a shows a cross-sectional view taken along line A-A in FIG. 2, illustrating a configuration of a main portion of the thin-film magnetic head 21 according to the present invention. FIG. 3b shows a perspective view illustrating a configuration of a main portion of the electromagnetic coil element 34 in the thin-film magnetic head.

In FIG. 3a, reference numeral 210 denotes a slider substrate made of such as AlTiC ($Al_2O_3$—TiC), which has the ABS 30 facing the surface of the magnetic disk. The MR effect element 33 for reading, the electromagnetic coil element 34 for writing, and the overcoat layer 39 for protecting these elements are formed on/above the element formation surface 31, which is a side surface when the ABS 30 of the slide substrate 210 is at the bottom.

The MR effect element 33 includes an MR effect multilayer 332, and a lower shield layer 330 and an upper shield layer 334 disposed so as to sandwich the MR effect multilayer 332 therebetween. The MR effect multilayer 332 includes a current-in-plane (CIP) giant magnetoresistive (GMR) effect multilayered film, a current-perpendicular-to-plane (CPP) GMR effect multilayered film, or a tunnel magnetoresistive (TMR) effect multilayered film, and senses a signal field from the magnetic disk with extremely high sensitivity. The upper and lower shield layers 334 and 330 prevent the MR effect multilayer 332 from receiving external magnetic fields that causes noise.

In the case that the MR effect multilayer 332 includes a CIP-GMR effect multilayered film, upper and lower shield gap layers for insulation are provided between the MR effect multilayer 332 and respective upper and lower shield layers 334 and 330. Further, an MR lead conductor layer is formed for supplying a sense current to the MR effect multilayer 332 and bringing out a reproduction output. On the other hand, in the case that the MR effect multilayer 332 includes a CPP-GMR effect multilayered film or a TMR effect multilayered film, the upper and lower shield layers 334 and 330 also function as upper and lower electrodes, respectively. In this case, the upper and lower shield gap layers and the MR lead conductor layer are not needed and are omitted. Further, though not shown in the figure, an insulating layer is formed between the upper and lower shield layers and on the side opposite to the head end surface 300 in relation to the MR effect multilayer 332. Further, insulating layers, or bias insulating layers and hard bias layers formed of a ferromagnetic material for applying a bias magnetic field may be formed on both sides in the track-width direction of the MR effect multilayer 332.

In the case that the MR effect multilayer 332 includes a TMR effect multilayered film, the multilayer 332 has a multilayered structure in which sequentially stacked are: an antiferromagnetic layer formed of such as IrMn, PtMn, NiMn or RuRhMn with a thickness of approximately 5 to 15 nm; a pinned layer in which the magnetization direction is fixed by the antiferromagnetic layer, having, for example, a monolayer structure of a ferromagnetic material such as CoFe or a multilayered structure of such as two CoFe layers sandwiching a non-magnetic metal layer of such as Ru; a tunnel barrier layer formed of a non-magnetic dielectric material obtained, for example, by oxidizing a metal film such as Al, AlCu or Mg with a thickness of approximately 0.5 to 1 nm with oxygen introduced into a vacuum equipment or with natural oxygen; and a free layer 45 having a double-layered structure of a ferromagnetic material film such as CoFe with a thickness of approximately 1 nm and a ferromagnetic material film such as NiFe with a thickness of approximately 3 to 4 nm. The free layer has a tunnel exchange coupling with the pinned layer through the tunnel barrier layer.

The lower shield layer 330 and the upper shield layer 334 are formed of, for example, NiFe, CoFeNi, CoFe, FeN or FeZrN with a thickness of approximately 0.5 to 3 μm (micrometers) by using, for example, a pattern plating method including a frame plating, or a sputtering method.

The electromagnetic coil element 34 includes a lower magnetic layer 340, a write gap layer 341, a write coil layer 343, a coil insulating layer 344, and an upper magnetic layer 345. The write coil layer 343 has a double-layered structure of a lower write coil layer 3430 and an upper write coil layer 3431, and is formed in such a manner that it passes at least in a turn through between the lower magnetic layer 340 and the upper magnetic layer 345. The lower magnetic layer 340 and the upper magnetic layer 345 function as a magnetic flux guide for a magnetic flux excited by the write coil layer 343 through which write currents flows. The write coil layer 343 is not limited to have the above-described double-layered structure, that is, it may have a monolayer structure, a more-than-three-layered structure or a helical coil structure.

A non-magnetic layer made of an insulating material or a metal is provided between the lower magnetic layer 340 and the upper shield layer 334 of the MR effect element 33 for isolating the MR effect element 33 from the electromagnetic coil element 34. However, the non-magnetic layer is not necessarily needed and may be omitted, and further, the lower magnetic layer 340 may serve for the upper shield layer.

The lower magnetic layer 340 includes: a lower yoke layer 3400; and a lower magnetic pole layer 3401 which is formed on the end portion on the ABS 30 side (head end surface 300 side) of the lower yoke layer 3400 and reaches the head end surface 300, and whose upper surface is in contact with the surface of the write gap layer 341.

The lower yoke layer 3400 is formed of, for example, NiFe, CoFeNi, CoFe, FeN or FeZrN with a thickness of approximately 0.5 to 3.5 μm (micrometers) by using, for example, a sputtering method or a pattern plating method including a frame plating. The lower magnetic pole layer 3401 is formed of, for example, NiFe, CoFeNi, CoFe, FeN or FeZrN with a thickness of approximately 0.25 to 0.6 μm (micrometers) by using, for example, a sputtering method. The saturation magnetic flux density of the lower magnetic pole layer 3401 is set to be higher than that of the lower yoke layer 3400, and is 2.0 T (teslas) or more.

The upper magnetic layer 345 includes; an upper magnetic pole layer 3450 whose lower surface is in contact with the surface of the write gap layer 341; a back-contact magnetic pole layer 3452 which is opposed to the upper magnetic pole layer 3450 through the portion of the write coil layer 343 passing through between the upper and lower magnetic layers 345 and 340 and whose lower surface is in contact with the surface of the lower magnetic layer 340; and an upper yoke layer 3451 whose end portion on the ABS 30 side is in contact with the surface of the upper magnetic pole layer 3450.

The lower magnetic pole layer 3401 and the upper magnetic pole layer 3450 sandwich the end portion on the ABS 30 side (head end surface 300 side) of the write gap layer 341. When write currents flow through the write coil layer 343, magnetic flux is generated within the upper and lower magnetic layers 345 and 340 including the upper and lower magnetic pole layers 3450 and 3401, and then write field, which is a leakage magnetic field from this end portion of the write gap layer 341, performs a write operation onto the magnetic disk. The ends on the magnetic disk side of the upper and lower magnetic pole layers 3450 and 3401 reach the head end surface 300, which are coated with ultrathin protective film made of a material such as diamond-like carbon (DLC).

The back-contact magnetic pole layer 3452 includes a non-magnetic layer 35. As shown in FIG. 3b, the non-magnetic layer 35 is provided within the back-contact magnetic pole layer 3452, and is wholly covered with magnetic material of at least one of the lower magnetic layer 340 and the upper magnetic layer 345. In effect, at least the surfaces other than both side surfaces 354 and 355, that is, at least the lower (bottom) surface 350, the upper surface 351, the front surface 352 and the rear surface 353 are covered with magnetic material.

In the present embodiment, the surface of the non-magnetic layer 35 other than the lower surface 350 is covered with magnetic material of the back-contact magnetic pole layer 3452, and the lower surface 350 of the non-magnetic layer 35 is covered with magnetic material of the lower magnetic layer 340. Further, a coverage width $t_{BC}$, which is the thickness of the magnetic material portion covering the non-magnetic layer 35 in the direction in-plane of the element formation surface, is set to be at least 1 μm or more. Alternatively, all the magnetic material covering the surfaces of the non-magnetic layer 35 may be magnetic material of the back-contact magnetic pole layer 3452. Further, the upper surface of the non-magnetic layer 35 may be covered with magnetic material of the upper yoke layer 3451. Furthermore, the shape on the cross-section parallel to the element formation surface of the non-magnetic layer 35 is a rectangle in the present embodiment, however, may be a trapezoid, an isosceles triangle, a circle, an ellipsoid or the like.

In the thin-film magnetic head according to the present invention, providing such non-magnetic layer 35 especially causes the generation of an eddy-current in the back-contact magnetic pole layer 3452 to be suppressed, which drastically reduces the eddy-current loss and improves the magnetic permeability. Further, because at least the lower surface 350, the upper surface 351, the front surface 352 and the rear surface 353 are covered with magnetic material, the magnetic flux in the upper and lower magnetic layers 345 and 340 does not receive significant resistance, which suppresses the leakage of the magnetic flux. As a result, as clearly shown in practical examples described later, the write characteristics in the high-frequency band are improved. Especially in the write characteristics, the sufficient write field intensity is maintained, and further, the ATE and the TPTP due to write currents are suppressed.

The non-magnetic layer 35 is formed of, for example, a non-magnetic insulating material such as SiO, $SiO_2$ (silicon dioxide), $Al_2O_3$ (alumina), SiN, AlN or DLC, or a non-magnetic metal such as Ti, Zr, Hf, Nb, Ta, Cr, Mo, W, Ir, Cu, Ag, Au or Al, or an alloy of two or more selected from these elements, with a thickness of approximately 0.3 to 2 μm by using, for example, a sputtering method or chemical vapor deposition (CVD) method. In the case that the non-magnetic layer 35 is formed of a non-magnetic insulating material, the generation of the eddy-current can be more suppressed. Even in the case that the non-magnetic layer 35 is formed of a non-magnetic metal (alloy), because the magnetic flux density near the center on the cross-section of a magnetic layer generally becomes distinctly low in the high-frequency band, the non-magnetic property of the non-magnetic layer 35 rather causes the magnetic permeability of the whole layer 3452 to be improved.

The upper magnetic pole layer 3450 and the back-contact magnetic pole layer 3452 are formed of, for example, NiFe, CoFeNi, CoFe, FeN or FeZrN with a thickness of approximately 0.5 to 3 μm by using, for example, a sputtering method or a pattern plating method including a frame plating. The upper yoke layer 3451 is formed of, for example, NiFe, CoFeNi, CoFe, FeN or FeZrN with a thickness of approximately 0.5 to 3 μm by using, for example, a sputtering method or a pattern plating method including a frame plating. The saturation magnetic flux density of the upper magnetic pole layer 3450 is set to be higher than that of the upper yoke layer 3451, and is 2.0 T (teslas) or more.

The overcoat layer 39 is formed of, for example, a non-magnetic material such as $SiO_2$ or $Al_2O_3$ by using, for example, a sputtering method so as to cover the MR effect element 33 and the electromagnetic coil element 34.

Here, the forming method of the back-contact magnetic pole layer 3452 including the non-magnetic layer 35 will be explained.

First, the write gap layer 341 is formed on the lower yoke layer 3400 by using, for example, a sputtering method or a CVD method. Then, the lower magnetic layer 340 is exposed by removing a portion of the write gap layer 341 through a resist pattern mask with dry etching method such as ion milling or a reactive ion etching, thus, formed is a back-gap portion. Next, formed are the write coil layer 343 and the coil insulating layer 344, and then, the non-magnetic layer 35 is formed on the back-gap portion by using, for example, a sputtering method or a CVD method, and further a photolithography method. After that, as well as the upper magnetic pole layer 3450 is formed on the write gap layer 341, the back-contact magnetic pole layer 3452 is formed by stacking a magnetic layer in such a way that the magnetic layer covers the non-magnetic layer 35. Alternatively, the non-magnetic layer 35 may be obtained by leaving a portion of the write gap layer 341 during forming the back-gap portion.

Returning to FIG. 3a, the coil insulating layer 344 has a double-layered structure of a lower coil insulating layer 3440 covering the lower write coil layer 3430 and a upper coil insulating layer 3441 covering the upper write coil layer 3431. The coil insulating layer 344 is provided to electrically isolate the write coil layer 343 from the upper and lower magnetic layers 345 and 340. Further, the lower write coil layer 3430 and the lower coil insulating layer 3440 is separated from the upper write coil layer 3431 and the upper coil insulating layer 3441 by an upper-coil/lower-coil insulating layer 342 for electrical isolation.

The upper and lower write coil layers 3431 and 3430 are formed of, for example, Cu with a thickness of approximately 0.3 to 5 µm by using, for example, a frame plating method. The upper and lower coil insulating layers 3441 and 3440 are formed of, for example, a heat-cured photoresist with a thickness approximately 0.5 to 7 µm by using, for example, a photolithography method. Further, the write gap layer 341 is formed of an insulating material such as $Al_2O_3$, $SiO_2$, AlN or DLC with a thickness of approximately 0.01-0.1 µm by using, for example, a sputtering method or a CVD method.

Figure 4A:
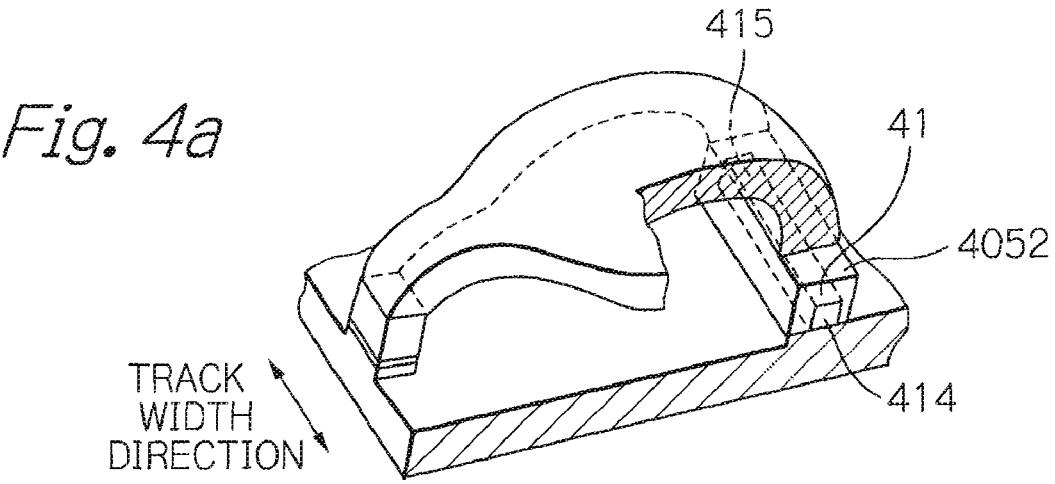
FIGS. 4a to 4d show perspective views and a cross-sectional view illustrating a configuration of an upper magnetic layer in alternatives of the thin-film magnetic head according to the present invention.
Figure 4B:
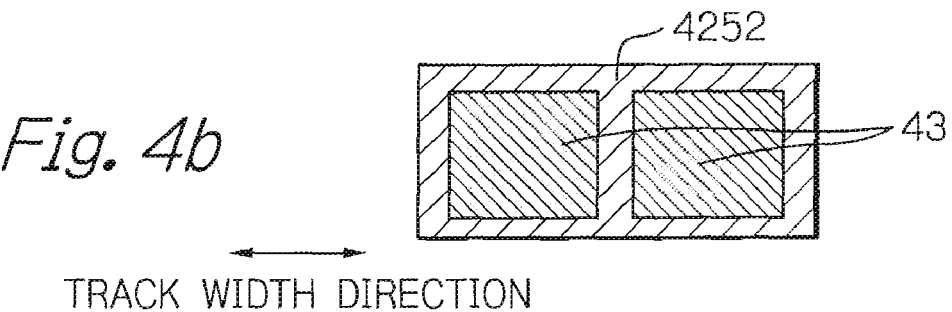

FIGS. 4a to 4d show perspective views and a cross-sectional view illustrating a configuration of an upper magnetic layer in alternatives of the thin-film magnetic head according to the present invention. The cross-sectional view shown in FIG. 4b illustrates the structure of the back-contact magnetic pole layer on the cross-section parallel to the element formation surface of the slider substrate.

According to FIG. 4a, both side surfaces 414 and 415 of the non-magnetic layer 41 provided within the back-contact magnetic layer 4052 is exposed to a non-magnetic region on respective side surfaces of the layer 4052. The non-magnetic region corresponds to a portion of the coil insulating layer 344 or the overcoat layer 39 (FIG. 3a). In this embodiment, at least the lower (bottom) surface, the upper surface, the front surface and the rear surface are covered with magnetic material, which drastically reduces the eddy-current loss and suppresses the leakage of the magnetic flux. As a result, the write characteristics in the high-frequency band are improved.

According to FIG. 4b, the non-magnetic layer 43 is constituted by two separated parts within the back-contact magnetic pole layer 4252. The number of the separated parts may be three or more. In this embodiment with such non-magnetic layer 43, the eddy-current loss in the back-contact magnetic pole layer 4252 is also drastically reduced, and the leakage of the magnetic flux is also suppressed. As a result, the write characteristics in the high-frequency band are improved.

Figure 4C:
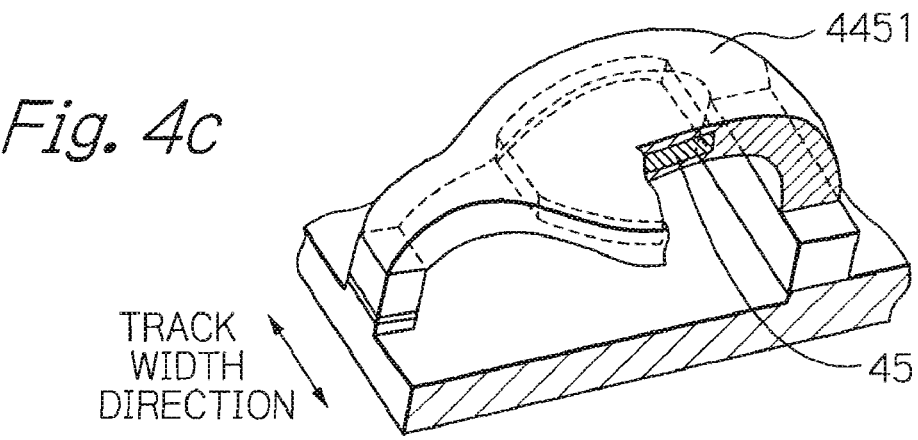

According to FIG. 4c, the non-magnetic layer 45 is provided within the upper yoke layer 4451, and is wholly covered with the magnetic material of the upper yoke layer 4451. In this case, both side surfaces of the non-magnetic layer 45 may be exposed to a non-magnetic region on respective side surfaces of the layer 4451. In this embodiment with such non-magnetic layer 45, the eddy-current loss in the upper yoke layer 4451 is also drastically reduced, which improves the magnetic permeability of the layer 4451 and suppresses the leakage of the magnetic flux. As a result, the write characteristics in the high-frequency band are improved.

Figure 4D:
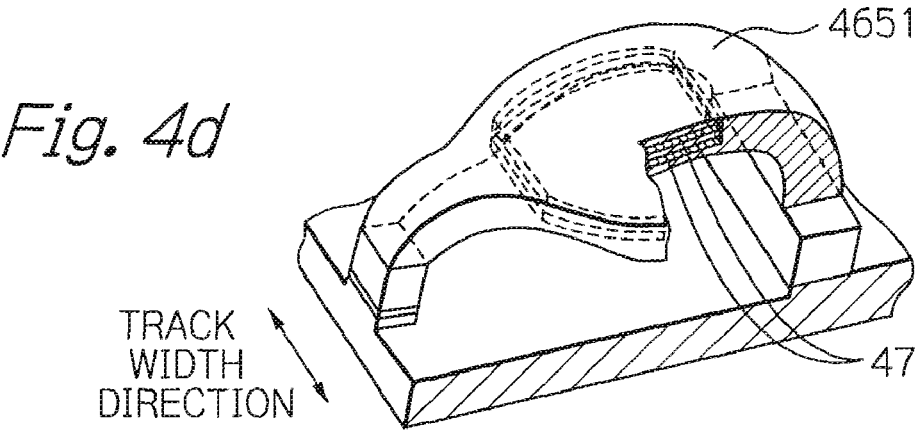

According to FIG. 4d, the non-magnetic layer 47 is constituted by two layers separated in up-to-down direction within the upper yoke layer 4651. The number of the separated layers may be three or more. In this embodiment with such non-magnetic layer 47, the eddy-current loss in the upper yoke layer 4651 is also drastically reduced, which improves the magnetic permeability of the layer 4651 and suppresses the leakage of the magnetic flux. As a result, the write characteristics in the high-frequency band are improved.

Here, the shape on the cross-section of the non-magnetic layer according to the present invention will be explained. The shapes on the cross-sections of non-magnetic layers shown in FIG. 3b and FIGS. 4a to 4d are a rectangle or a bending rectangle, in which each cross-section corresponds to that taken along line A-A in FIG. 2. However, the non-magnetic layer with a shape having round corners or a shape having tapered/sharp end(s) also falls within the scope of the present invention because the eddy-current loss is drastically reduced and suppresses the leakage of the magnetic flux in such modes. Further, the non-magnetic layer provided within both the back-contact magnetic pole layer and the upper yoke layer also falls within the scope of the present invention because the eddy-current loss is more drastically reduced and the leakage of the magnetic flux remains to be suppressed in such modes.

Figure 5A:
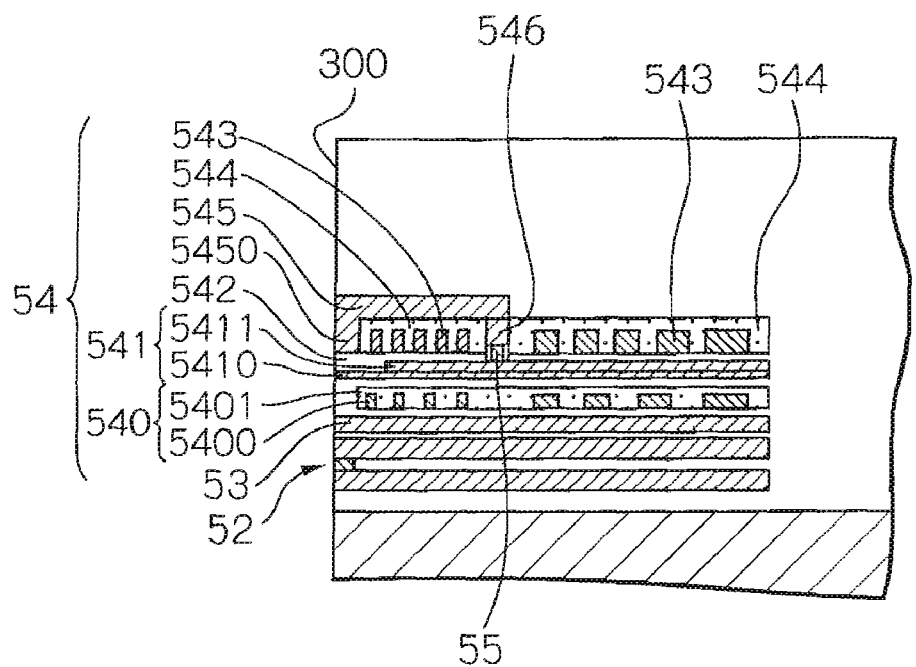
FIG. 5a shows a cross-sectional view taken along line A-A in FIG. 2, illustrating a configuration of a main portion of another embodiment of the thin-film magnetic head according to the present invention.
Figure 5B:
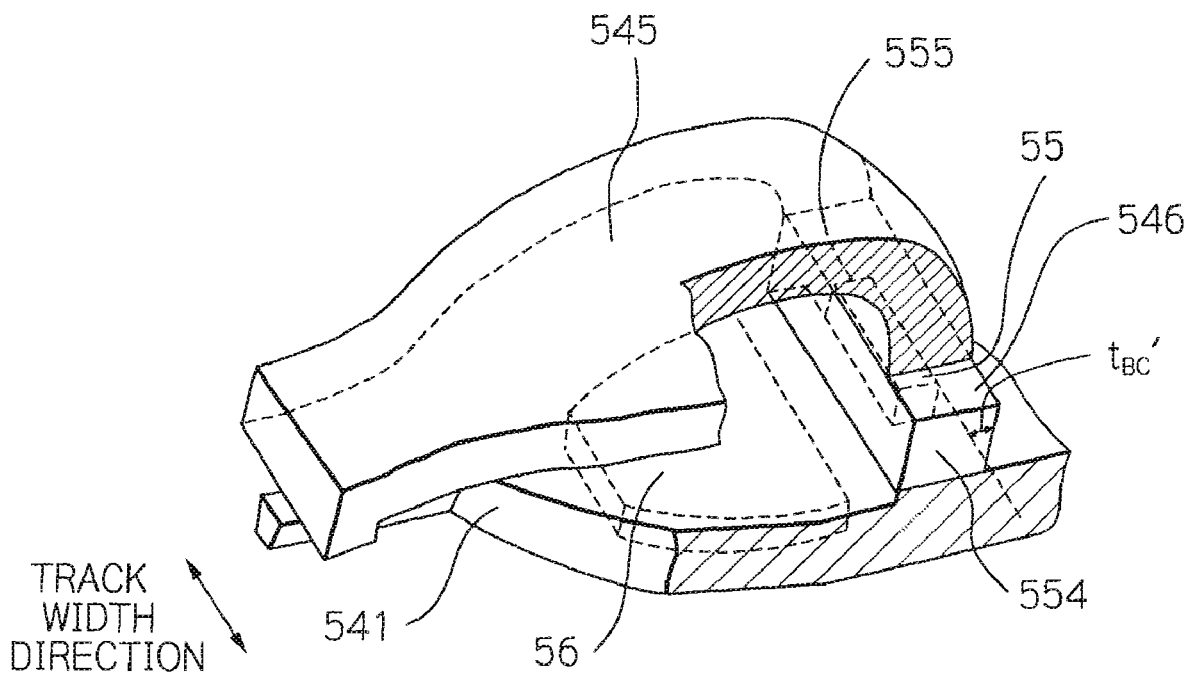
FIG. 5b shows a perspective view illustrating a configuration of a main portion of the electromagnetic coil element in the thin-film magnetic head.

FIG. 5a shows a cross-sectional view taken along line A-A in FIG. 2, illustrating a configuration of a main portion of another embodiment of the thin-film magnetic head according to the present invention. FIG. 5b shows a perspective view illustrating a configuration of a main portion of the electromagnetic coil element in the thin-film magnetic head.

As shown in FIG. 5a, the electromagnetic coil element 54 is for perpendicular magnetic recording, and includes a backing coil portion 540, a main magnetic pole layer 541, a gap layer 542, a write coil layer 543, a coil insulating layer 544, an auxiliary magnetic pole layer 545 and a back-contact magnetic pole layer 546. Reference numeral 53 is an inter-element shield layer that acts as a magnetic shield between the electromagnetic coil element 54 and the MR effect element 52 for reading data.

The main magnetic pole layer 540 is a magnetic path for converging magnetic flux excited by the write coil layer 543 with write currents applied and for guiding the magnetic flux to a perpendicular magnetic record layer of the magnetic disk on which data are to be written. The main magnetic pole layer 540 is constructed of a main pole principal layer 5411 and a main pole support layer 5410. Here, the length (thickness) in the layer thickness direction of the end portion of the main magnetic pole layer 541 on the head end surface 300 side is set to be smaller in correspondence with the layer thickness of this main pole principal layer 5411 only. As a result, it is possible to generate a fine write field in response to increasingly higher recording densities.

The end portion of the auxiliary magnetic pole layer 545 on the head end surface 300 side constitutes a trailing shield portion 5450 having a wider layer cross-section than other portions of the layer 545. The trailing shield portion 5450 is opposed to the end portion on the ABS side of the main magnetic pole layer 541 through the gap layer 542. Providing this trailing shield portion 5450 causes the gradient of the magnetic field between the end portion of the trailing shield portion 5450 and the end portion of the main magnetic pole layer 541 to become steeper. As a result, jitter of signal outputs becomes smaller, which can reduce the error rate during read operation.

The write coil layer 543 is formed in such a manner that it passes at least in a turn through between the main magnetic pole layer 541 and the auxiliary magnetic pole layer 545. The coil insulating layer 544 covers the write coil layer 543, and is provided to electrically isolate the write coil layer 543 from the main magnetic pole layer 541, the auxiliary magnetic pole layer 545 and the back-contact magnetic pole layer 546.

The back-contact magnetic pole layer 546 includes a non-magnetic layer 55. As shown in FIG. 5b, the non-magnetic layer 55 is provided within the back-contact magnetic pole layer 546, and is wholly covered with magnetic material of at least one of the main magnetic pole layer 541 and the auxiliary magnetic pole layer 545. In effect, at least the surfaces other than both side surfaces 554 and 555, that is, at least the lower (bottom) surface, the upper surface, the front surface and the rear surface are covered with magnetic material. Further, a coverage width $t_{BC}'$, which is the thickness of the magnetic material portion covering the non-magnetic layer 35 in the direction in-plane of the element formation surface, is set to be at least 1 µm or more.

In this embodiment with such non-magnetic layer 55, especially, the eddy-current loss in the back-contact magnetic pole layer 546 is drastically reduced, which improves the magnetic permeability and suppresses the leakage of the magnetic flux. As a result, the write characteristics in the high-frequency band are improved. In particular in the write characteristics, the sufficient write field intensity is maintained, the ATE is suppressed, and further, the TPTP due to write currents is also suppressed.

As an alternative, also as shown in FIG. 5b, the non-magnetic layer 56 is provided within the main magnetic pole layer 541, and is wholly covered with the magnetic material of the layer 541. In this case, both side surfaces of the non-magnetic layer 56 may be exposed to a non-magnetic region on respective side surfaces of the layer 541. In this embodiment, the eddy-current loss in the main magnetic pole layer 541 is also drastically reduced, which improves the magnetic permeability of the layer 541 and suppresses the leakage of the magnetic flux. As a result, the write characteristics in the high-frequency band are improved.

Returning to FIG. 5a, in the electromagnetic coil element 54, a backing coil portion 540 is provided between the inter-element shield layer 53 and the main magnetic pole layer 541. The backing coil portion 540 is constituted by a backing coil layer 5400 and a backing coil insulating layer 5401, and is intended to generate magnetic flux for canceling out a magnetic flux loop which is generated from the main magnetic pole layer 541 and the auxiliary magnetic pole layer 545 and goes through the upper and lower shield layers in the MR effect element 52, and thus, for suppressing a wide adjacent track erase (WATE) phenomenon which is an unnecessary write or erasure operation on the magnetic disk.

FIGS. 6a1 to 6c show cross-sectional views and perspective views illustrating other embodiments of the thin-film magnetic head having the back-contact magnetic pole layer with the non-magnetic layer therewithin. The cross-sections of the nonmagnetic layers in these figures are parallel to the element formation surface. Further, the back-contact magnetic pole layers shown in FIGS. 6a1 to 6c may be within the heads for perpendicular or longitudinal magnetic recording.

As shown in FIG. 6a1, the rear surface of the non-magnetic layer 61 has a portion 62 that is connected to a non-magnetic region 63 covering the back-contact magnetic pole layer 60. In the case that this cross-sectional structure of the non-magnetic layer 61 extends over the thickness range of the back-contact magnetic pole layer 60, as shown in FIG. 6a2, the portion 62 has a slit (gap) shape in the layer 60. While, in the case that this cross-sectional structure of the non-magnetic layer 61 extends only in a range of the thickness of the layer 60, as shown in FIG. 6a3, the portion 62 has a hole shape in the back-contact magnetic pole layer 60.

In another respect of the present embodiment, the back-contact magnetic pole layer 60 has a C-shape or a U-shape with a gap in the end portion on the side opposite to the ABS, on the cross-section of the non-magnetic layer 61 parallel to the element formation surface, and thus, the back-contact magnetic pole layer 60 surrounds the non-magnetic layer 61 except the gap position. Here, the non-magnetic region 63 corresponds to a portion of the coil insulating layer or the overcoat layer in each of the heads for perpendicular magnetic recording and longitudinal magnetic recording.

The portion 62 connected to the non-magnetic region 63 may be provided in other position, for example, a portion on both side surfaces of the non-magnetic layer 61 or a portion on the front surface of the non-magnetic layer 61. However, the portion 62 is preferably provided in the position as shown in FIG. 6a1, from the viewpoint of the distribution of magnetic flux density in the magnetic circuit (flux guide) of the whole lower and upper magnetic layers.

The width (gap length) $d_G$ of the portion 62 is, for example, in the range of approximately 0.1 to 10 µm. The width $d_G$ is preferably set to be as small as possible from the viewpoint of required lower resistance of the magnetic circuit of the lower and upper magnetic layers. For example, the insulating limit value of the width can be set to the degree of 0.1 µm. In this case, the coverage width $t_{BC}$ may be the same as that shown in FIG. 3b.

In this embodiment with such portion (gap) 62, the formation of loop current circuit surrounding the non-magnetic layer 61 is prevented, which reduces the eddy-current. As a result, the write characteristics in the high-frequency band of the thin-film magnetic head can be improved.

Further, as shown in FIG. 6b, multiple portions 66 (two portions in the figure) connected to the non-magnetic region 67 may be provided in the back-contact magnetic pole layer 64. In this embodiment, for avoiding a negative effect of less magnetic material covering the non-magnetic layer 65, it is required to suppress the increase in resistance of the magnetic circuit of the lower and upper magnetic layers.

Further, as shown in FIG. 6c, the portion 70 connected to the non-magnetic region 71 may be provided while both side surfaces of the non-magnetic layer 69 are exposed to the non-magnetic region 71. Even in this embodiment, the formation of loop current circuit surrounding the non-magnetic layer 69 can be evidently prevented.

Hereinafter, the effect of improving write characteristics in the high-frequency band in the thin-film magnetic head according to the present invention will be explained by using practical examples of the present invention and the conventional example.

(Structures in Practical Examples 1 and 2)

Figure 7A:
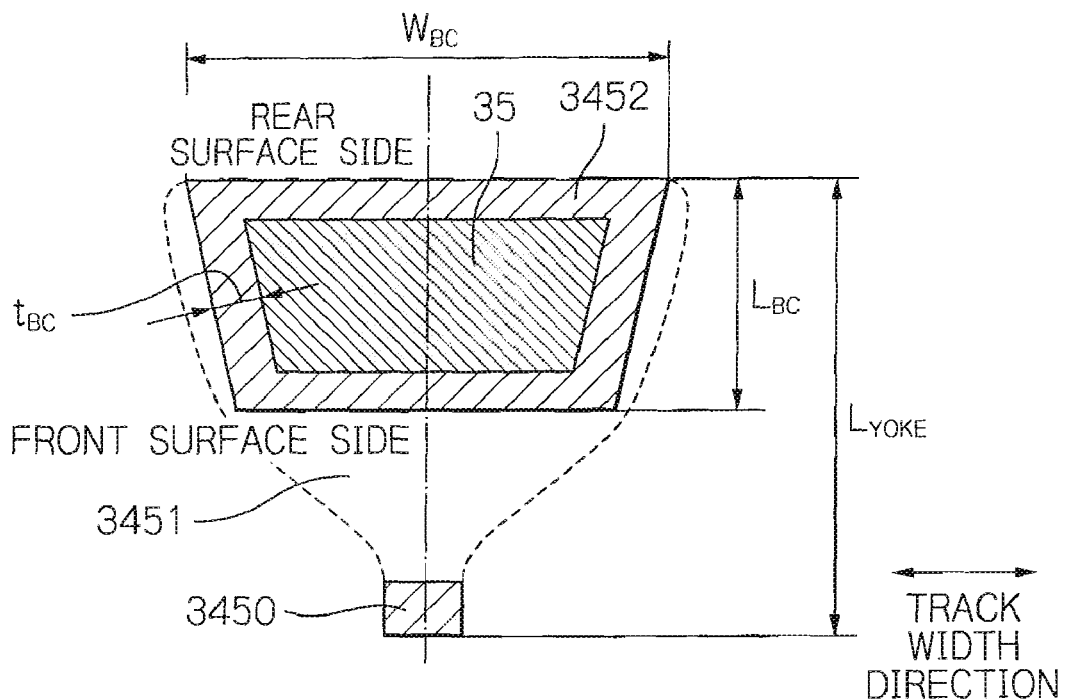
FIGS. 7a and 7b show cross-sectional views on the cross-section parallel to the element formation surface, schematically illustrating structures of back-contact magnetic pole layers in practical examples 1 and 2, respectively.
Figure 7B:
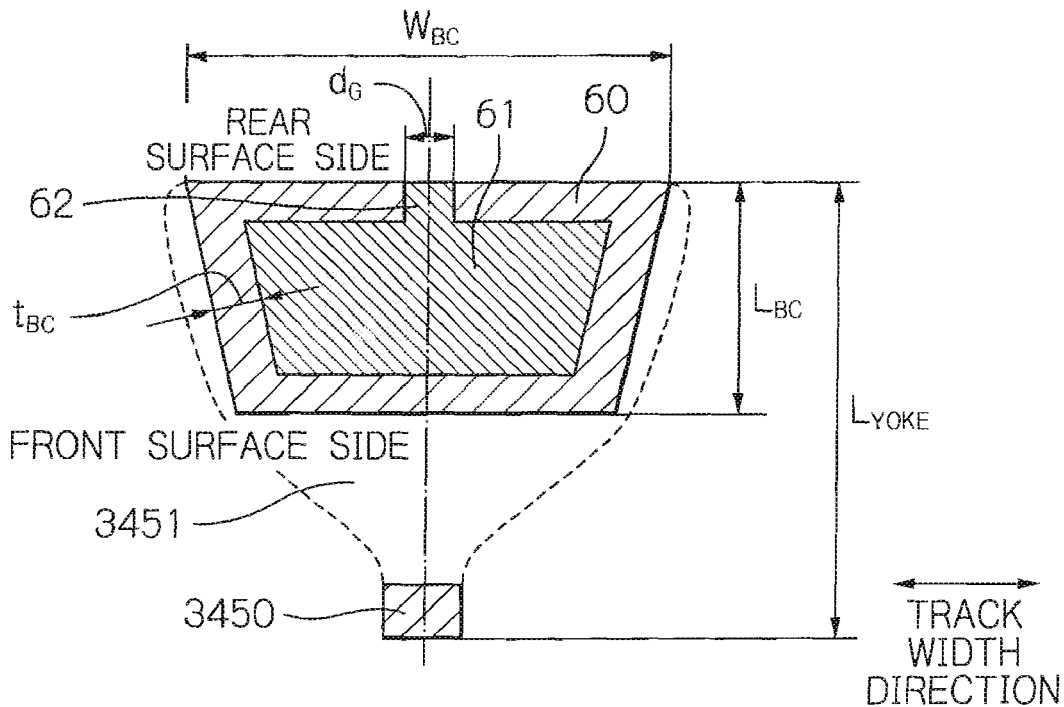

FIGS. 7a and 7b show cross-sectional views on the cross-section parallel to the element formation surface, schematically illustrating structures of back-contact magnetic pole layers in practical examples 1 and 2, respectively.

As shown in FIG. 7a, in the thin-film magnetic head for longitudinal magnetic recording as practical example 1, the non-magnetic layer 35 within the back-contact magnetic pole layer 3452 is wholly covered with magnetic material. And as shown in FIG. 7b, in the thin-film magnetic head for longitudinal magnetic recording as practical example 2, the non-magnetic layer 61 within the back-contact magnetic pole layer 60 is wholly covered with magnetic material except a gap (a portion connected to the non-magnetic region) 62.

In FIGS. 7a and 7b, the coverage width $t_{BC}$ of each of the back-contact magnetic pole layers 3452 and 60 is the thickness of the magnetic material portion covering each of the non-magnetic layers 35 and 61 in the direction in-plane of the element formation surface. Five types of head samples were prepared, in which the coverage widths $t_{BC}$ were 0.5, 1.0, 1.5, 2.0 and 2.5 μm, respectively. In FIG. 7b, the gap width (gap length) $d_G$ of the back-contact magnetic pole layer 60 was 2.0 μm.

Further, in practical examples 1 and 2 shown in FIGS. 7a and 7b, the width $W_{BC}$ in the track width direction of each of the back-contact magnetic pole layers 3452 and 60 was 10.0 μm, and the length $L_{BC}$ in the direction perpendicular to the track width direction (direction perpendicular to the ABS) was 5.8 μm. Further, the length $L_{YOKE}$ in the direction perpendicular to the track width direction (direction perpendicular to the ABS) of the upper yoke layer 3451 was 13.8 μm, and the thickness (gap length) of the write gap layer 341 was 0.09 μm. Furthermore, the saturation magnetic flux density $B_S$ of each of the upper and lower yoke layers 3451 and 3400 was 2.0 T (teslas), and the saturation magnetic flux density $B_S$ of each of the lower magnetic pole layer 3401, the upper magnetic pole layer 3450 and the back-contact magnetic pole layers 3452 and 60 was 2.4 T. The conventional head had the same structure as the above-described heads of practical examples 1 and 2, except that the conventional head did not have a back-contact magnetic pole layer with the non-magnetic layer.

(Measurement Results of Write Field Intensity)

FIG. 8 shows a graph illustrating the relations between the coverage width $t_{BC}$ of the back-contact magnetic pole layer and the write field intensity in the heads of practical examples and the conventional head.

The amount of write current applied to the write coil layer was 50 mA in all heads. The write field intensity was the intensity of the magnetic field adjacent to the portion on the ABS side (the head end surface side) of the write gap layer.

According to FIG. 8, the write field intensity is approximately 9630 Oe (Oersteds) (approximately 767 kA/m) at the coverage width $t_{BC}$=0.5 μm in both practical examples 1 and 2, which is slightly deceased compared to the conventional head of 9860 Oe (approximately 785 kA/m). However, the write field intensity at the coverage width $t_{BC}$=1.0, 1.5, 2.0, 2.5 μm in both practical examples 1 and 2 has almost the same value as that of the conventional head. Therefore, it is understood that the head according to the present invention has no large degradation of write field intensity, and especially in the case that the back-contact magnetic pole layer has the coverage width $t_{BC}$ of 1 μm or more, the head according to the present invention has almost the same write field intensity as the conventional head.

(Measurement Results of TPTP Due to Write Currents)

Figure 9A:
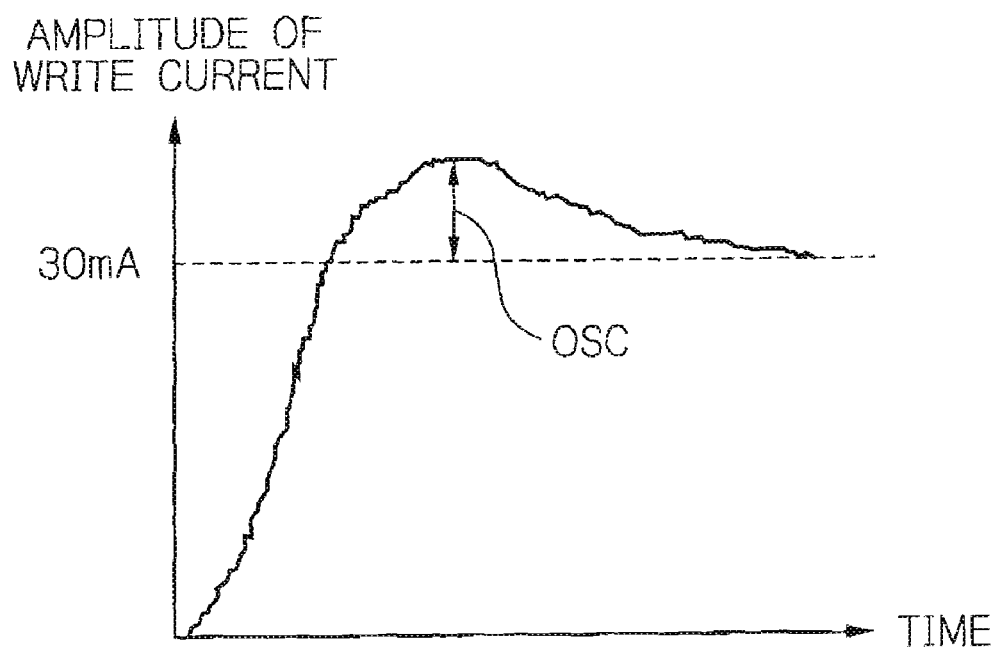
FIG. 9a shows a graph explaining the setting of write current value for the measurement of the TPTP due to write currents in the heads of practical examples 1 and 2 and the conventional head.
Figure 9B:
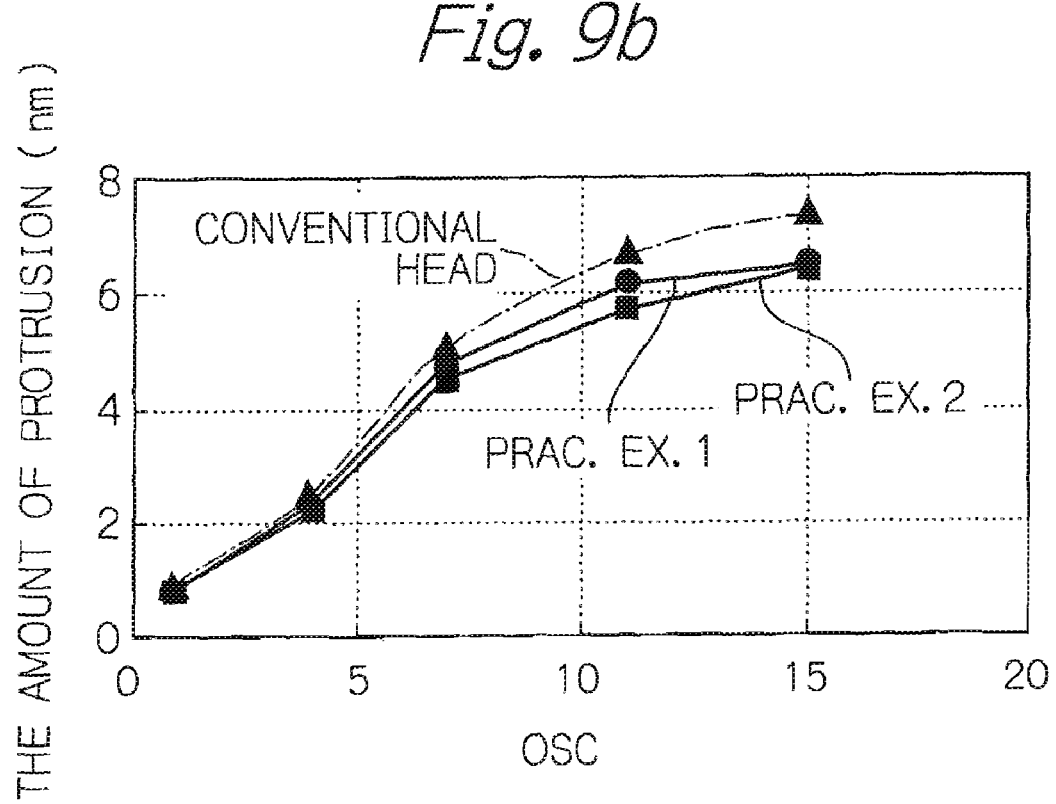
FIG. 9b shows a graph illustrating the relation between the set value of write current and the TPTP due to write currents in the heads of practical examples 1 and 2 and the conventional head.

FIG. 9a shows a graph explaining the setting of write current value for the measurement of the TPTP due to write currents in the heads of practical examples 1 and 2 and the conventional head, and FIG. 9b shows a graph illustrating the relation between the set value of write current and the TPTP due to write currents in the heads of practical examples 1 and 2 and the conventional head.

As shown in FIG. 9a, the amplitude of the write current applied to the write coil layer is set so as to be 30 mA in the steady state, however, instantaneously overshoot from the 30 mA in the initial rising time. In the practical examples, the amount of overshoot is defined as an overshoot current (OSC), and the TPTP due to write currents was measured under the condition of write currents with various OSCs. The write frequency of the write current was approximately 500 MHz, which is rather high frequency for magnetic recording. The value of OSC shown in FIG. 9b has an arbitrary unit because of depending on the setting of the amplifier.

Next, the measurement method of the TPTP due to write currents will be explained as follows. First, a usual write operation (the first write operation) was performed by using a head under measurement. Then, a read operation to the written track was performed by this head, and thus the first reproduction output was measured. After that, on a position appropriately distant from the track along the radius direction of the magnetic disk, a dummy write operation (the second write operation) was performed. In the second write operation, performed were 5 types of writing in which the OSC of write current was 1.0, 4.0, 7.0, 11.0 and 15.0. Then, just after the writing performance of the respective 5 types, the second reproduction output was measured by performing another read operation with this head from the track to which the first write operation was performed.

In the above-described measurement, the TPTP due to the second write operation, which is the amount of protrusion of the end of the magnetic head element toward the magnetic disk, is changed according to the OSC of write current. The larger the amount of protrusion becomes, the smaller the distance between the end of the magnetic head element and the surface of the magnetic disk becomes. Thus, the second reproduction output becomes larger than the first reproduction output. Therefore, the amount of the protrusion due to the OSC of write current can be obtained from the difference between the first and second reproduction output. Consequently, as shown in FIG. 9b, the amount of TPTP due to write currents of the head under measurement can be determined by the graph showing the OSC dependence of the amount of protrusion in which the horizontal axis is OSC and the vertical axis is the TPTP due to write currents, that is, the amount of the protrusion.

In the heads of practical examples 1 and 2, the head used for the present measurement had the back-contact magnetic pole layer with the coverage width $t_{BC}$ being 1.0 μm.

According to FIG. 9b, the amounts of protrusion of the conventional head and the heads of practical examples 1 and 2 increase with the value of the OSC. However, at any value of the OSC, the heads of practical examples 1 and 2 have smaller amount of protrusion than the conventional head. Especially, the head of practical example 2 with the gap 62 has more significant decrease in the amount of protrusion. This is thought to be because as follows: The gap 62 causes the eddy-current to be suppressed more significantly, and thus, the loss heat is distinctly decreased, as a result, the total amount of heat that expands the magnetic head element is more decreased. Consequently, it is understood that the head according to the present invention shows sufficiently suppressed TPTP due to write currents compared to the conventional head.

(Measurement Results of NTLS)

Figure 10:
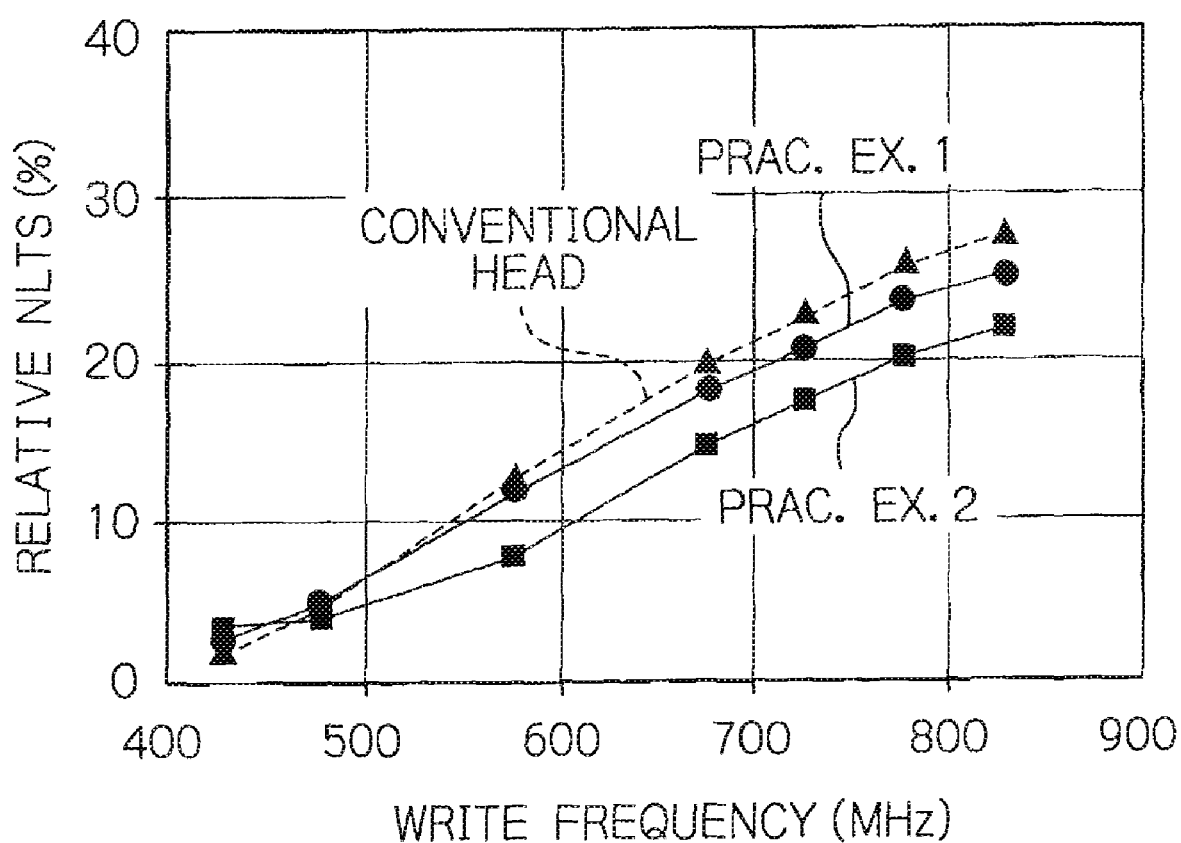
FIG. 10 shows a graph illustrating the write frequency dependence of the non-linear transition shift (NLTS) in the heads of practical examples 1 and 2 and the conventional head.

FIG. 10 shows a graph illustrating the write frequency dependence of the non-linear transition shift (NLTS) in the heads of practical examples 1 and 2 and the conventional head.

In the heads of practical examples 1 and 2, the head used for the present measurement had the back-contact magnetic pole layer with the coverage width $t_{BC}$ being 1.0 μm. The horizontal axis of FIG. 10 is a write frequency of the write field by which record bits for measuring the NLTS were written, and the vertical axis is a relative NLTS (%) which is an increment of the NLTS when a bit length of data is defined as a standard. The measurement of the NLTS was performed as follows: After record bits were written with a predetermined write frequency, the time shift of the read signals was measured when record bits were further written with the same write frequency.

As shown in FIG. 10, the relative NLTSs of the heads of practical examples 1 and 2 and the conventional head increase with the write frequency. In the write-frequency range of 480 MHz or less, these three NLTSs have almost no difference. However, in the high write-frequency range of more than 480 MHz, the relative NLTSs of the heads of practical examples 1 and 2 are more decreased at any write frequency value compared to the conventional head. Especially, the relative NLTS of the heads of practical example 2 has most significant decrease. This is thought to be because as follows: The gap 62 of practical example 2 causes the eddy-current to be suppressed more significantly, and thus, the time delay in the variation of the write field due to the eddy-current is drastically avoided, as a result, the rising time of the write field becomes shorter, that is, the write characteristics in the high-frequency band is improved. Consequently, it is understood that the head according to the present invention shows sufficiently decreased NTLS, especially in the high-frequency band, compared to the conventional head.

(Measurement Results of ATE)

FIGS. 11*a* to 11*d* show a schematic diagram and graphs illustrating a measuring method of the ATE used for the head of practical example 1 and the conventional head.

For the ATE measurement, first, a head under measurement was used to write a predetermined number of tracks ($T_{-3}$ to $T_4$ shown in FIG. 11*a*, excluding $T_0$ at the center) on a magnetic disk approximately 2 inches in diameter. The track pitch was equal to the effective track width $W_E$ of the head, and the write frequency $f_1$ was approximately 300 MHz which is rather high in magnetic recording. Then, output components near the frequency $f_1$ from the written tracks are measured in the track width direction (along the radius of the disk) by using an MR effect element. As a result, an output voltage profile P1 as shown in FIG. 11*b* was obtained, in which the horizontal axis represents the position along the radius of the disk.

Figure 11A:
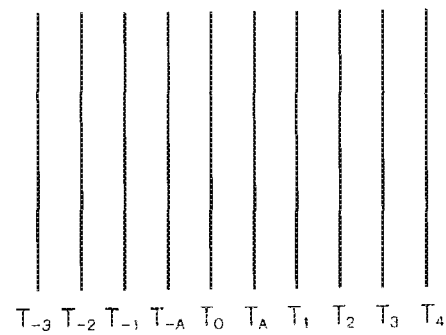
FIGS. 11a to 11d show a schematic diagram and graphs illustrating a measuring method of the ATE used for the head of practical example 1 and the conventional head.
Figure 11B:
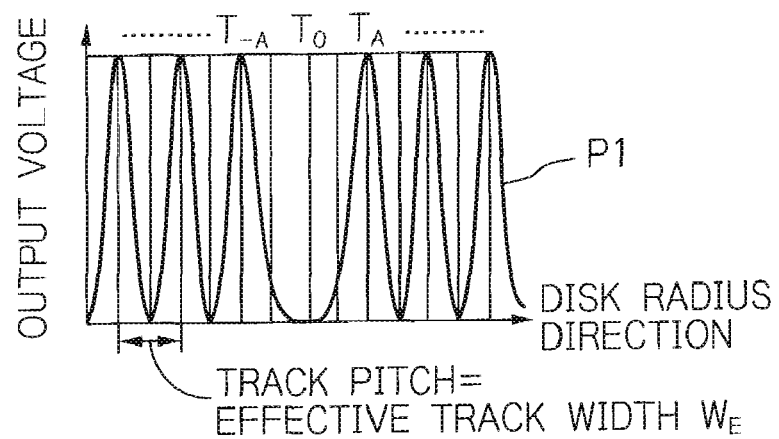
Figure 11C:
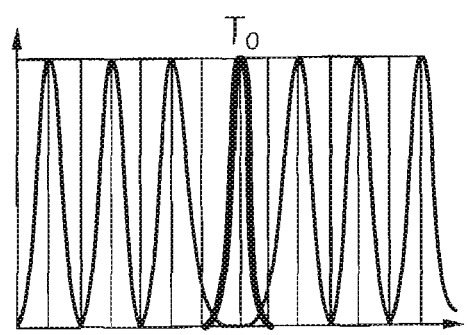
Figure 11D:
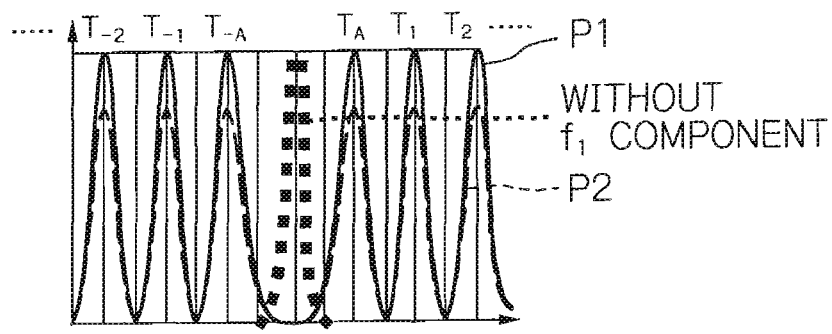

Then, about 10,000 write operations were performed in the position of track $T_0$ shown in FIG. 11*a* with a write frequency $f_2$ higher than the frequency $f_1$ (FIG. 11*c*). Then, output components near the frequency $f_1$ were measured again to obtain an output voltage profile P2 as shown in FIG. 11*d*. In the output voltage profile P2, the peaks at the track positions generally attenuate as compared with P1. The degree of attenuation was used to evaluate the degree of ATE of the head. In track position $T_0$, no output component of the frequency $f_1$ was found.

Figure 12:
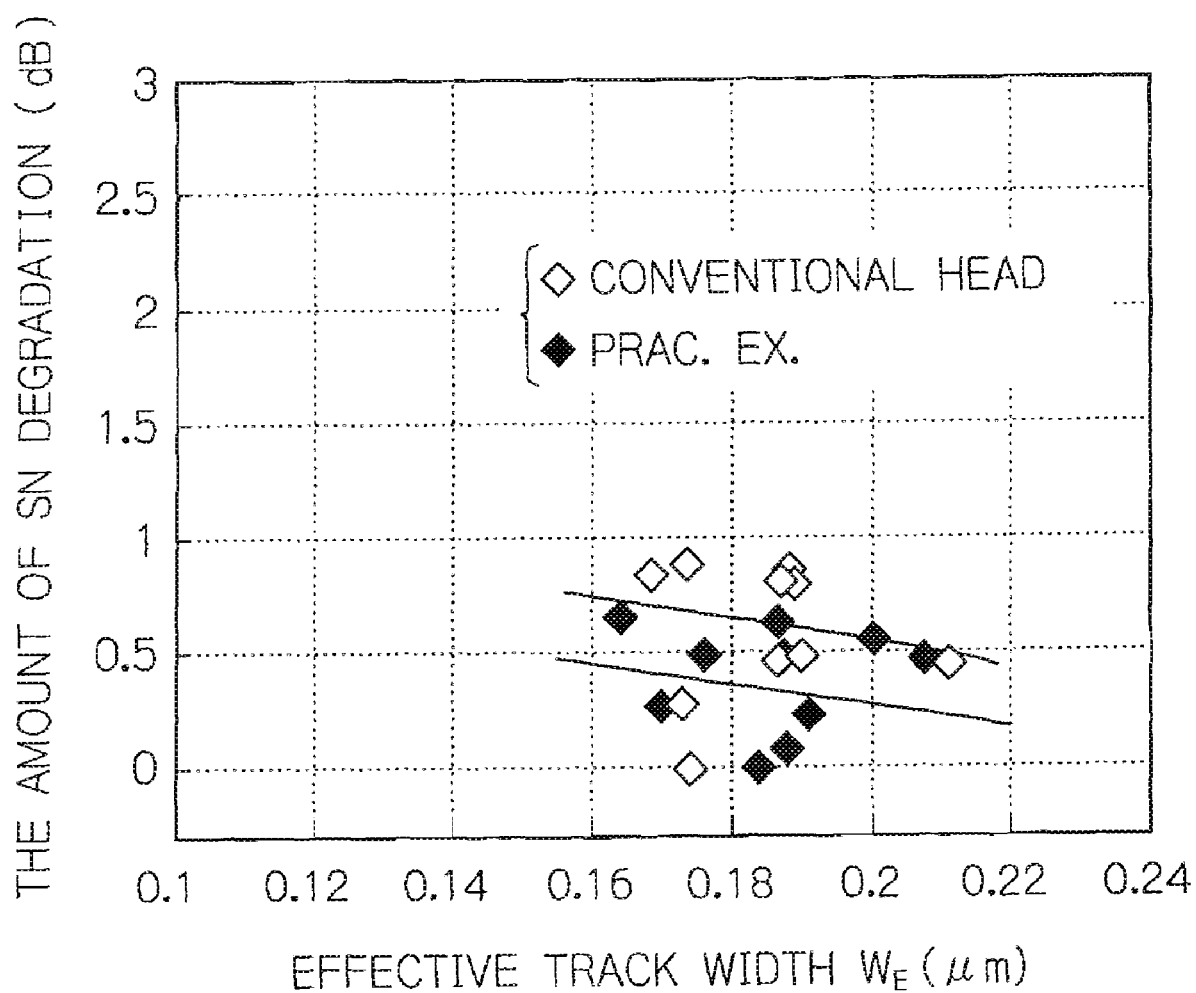
FIG. 12 shows a graph illustrating the influence of the ATE on the S/N ratio in the heads of practical example 1 and the conventional heads having different effective track widths $W_E$.

FIG. 12 shows a graph illustrating the influence of the ATE on the S/N ratio in the heads of practical example 1 and the conventional heads having different effective track widths $W_E$.

In the experiment whose result is shown in FIG. 12, for examining the influence of the ATE on the S/N ratio, the method described by using FIGS. 11*a* to 11*d* was used to determine the output voltage profile as shown in FIG. 11*d* of each head having the different effective track widths $W_E$, and the ratio of the noise voltage to the output voltage in each track in the profile, namely the S/N ratio, was measured. Here, measured was the track that exhibited the highest attenuation among tracks $T_{-3}$ to $T_4$. The vertical axis of the graph represents the degree of S/N ratio degradation in the track due to 10,000 write operations in track $T_0$, namely the amount of S/N ratio degradation=(initial S/N ratio)−(S/N ratio after the write operations in $T_0$). The Greater the amount of S/N degradation becomes, the more seriously the track is affected by the noise increase caused by the ATE.

The heads of practical example 1 used for the present measurement had the back-contact magnetic pole layer with the coverage width $t_{BC}$ being 1.0 μm.

As shown in FIG. 12, though data are somewhat varied, the heads of practical example 1 have an average value being 0.4 dB (decibel) of the amount of S/N ratio degradation in the range of the measured effective track widths $W_E$. On the other hand, the conventional heads have an average value being 0.7 dB. Therefore, the amount of S/N ratio degradation of the head of practical example 1 is found to be smaller than that of the conventional head. Consequently, according to the thin-film magnetic head of the present invention, it is understood that the ATE in the high-frequency band can be more reduced.

As described above, the thin-film magnetic head according to the present invention shows improved write characteristics in the high-frequency band. Especially in the improved write characteristics, the sufficient write field intensity is obtained, the ATE and the TPTP due to write currents are suppressed, and further, the NLTS is also suppressed. Here, one of the reasons why the presence of the non-magnetic layer causes the TPTP due to write currents to be suppressed is thought to be that the amount of heat to expand the magnetic head element is decreased due to the reduction of the eddy-current loss and thus the loss heat. And one of the reasons why the presence of the non-magnetic layer causes the ATE to be suppressed is thought to be as follows: Unwanted write operation due to the leakage field becomes difficult to occur as a result that the distance between the end of the magnetic head element and the surface of the magnetic disk is controlled within a predetermined range due to the suppression of the TPTP due to write currents. Further, one of the reasons why the presence of the non-magnetic layer causes the NLTS to be suppressed is thought to be that the rising time of the write field becomes short as a result that the occurrence of the eddy-current is suppressed, and thus the time delay in the variation of the write field due to the eddy-current is drastically avoided.

Hereinafter, more effectiveness of providing a non-magnetic layer within the back-contact magnetic pole layer will be explained by using simulation results.

Figure 13A:
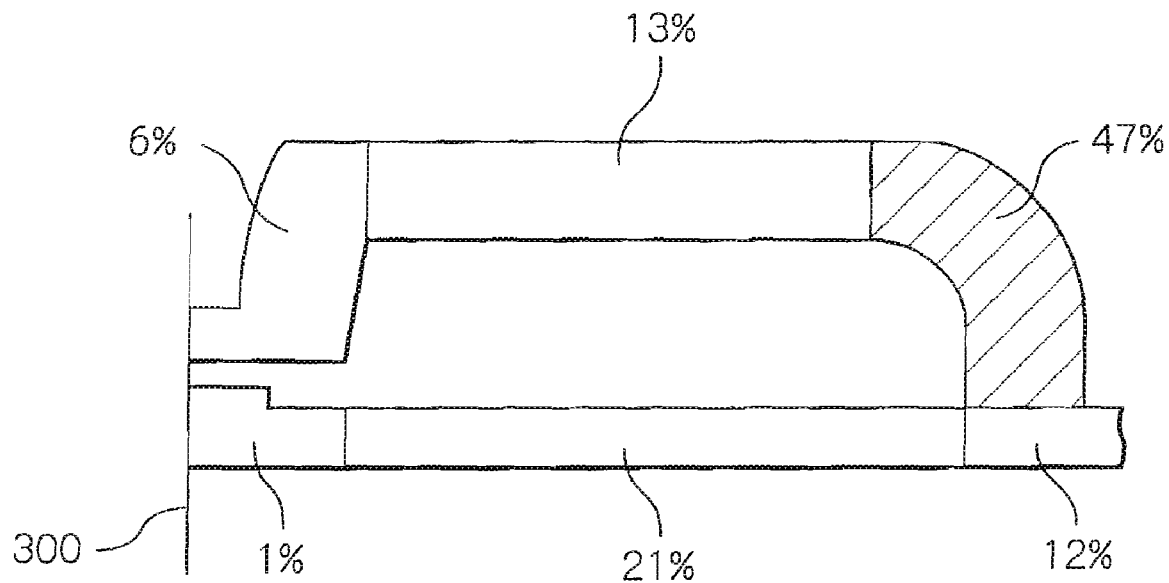
FIGS. 13a and 13b show cross-sectional views of upper and lower magnetic layers, illustrating the simulation results of the distribution of the eddy-current loss in two conventional types of electromagnetic coil elements.
Figure 13B:
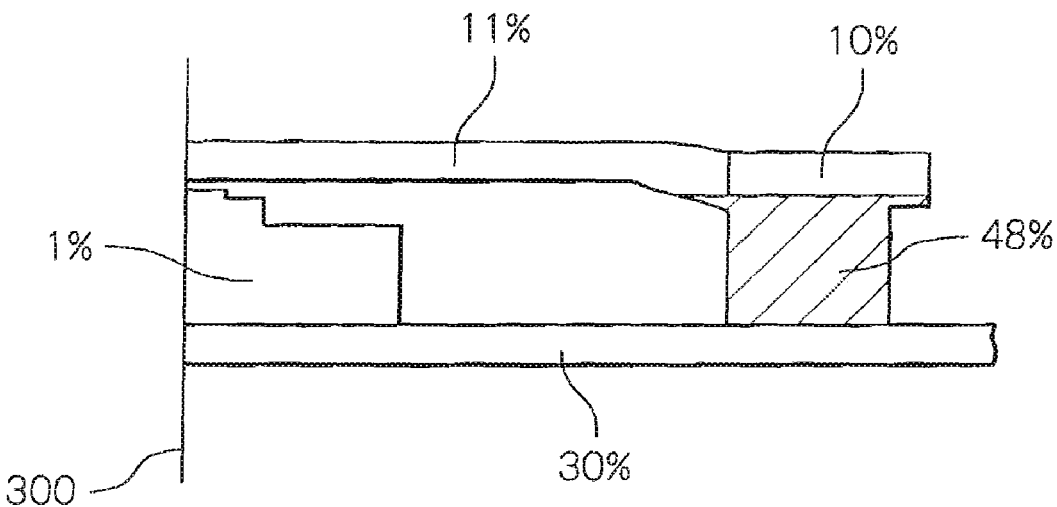

FIGS. 13*a* and 13*b* show cross-sectional views of upper and lower magnetic layers, illustrating the simulation results of the distribution of the eddy-current loss in two conventional types of electromagnetic coil elements.

In the simulations, write current passing through a write coil layer was increased from 0 mA at start point (zero second) to 100 mA at $1\times10^{-10}$ second, and then kept a constant value of 100 mA till $1.90\times10^{-10}$ second. In FIGS. 13*a* and 13*b*, the upper and lower magnetic layers were divided into several regions, and then, the amount of heat in each region generated from eddy-current caused by the write current was calculated, which gave the distribution of the eddy-current loss.

As shown in FIGS. 13a and 13b, the region including back-contact magnetic pole layer (hatching region) has the highest percentage in the distribution of the eddy-current loss, that is, respective percentages are 47% and 48% in FIGS. 13a and 13b, almost equivalent to the half of the total eddy-current loss. This is an unexpected result because the back-contact magnetic pole layer has conventionally been thought to have less eddy-current loss. In fact, for example, U.S. Pat. Nos. 6,490,126 and 6,646,828 describe a magnetic pole or yoke including a non-magnetic region, however, never describe a back-contact magnetic pole layer including a non-magnetic region.

From the above-described results, it is understood that the eddy-current loss is generated most seriously in the region including the back-contact magnetic pole layer, and therefore, providing a non-magnetic layer within the back-contact magnetic pole layer evidently has an excellent effect to suppress the total eddy-current loss.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head including an electromagnetic coil element, said electromagnetic coil element comprising:
   an upper magnetic layer and a lower magnetic layer, formed on an element formation surface of a substrate having an air bearing surface;
   a write gap layer, an end portion on the air bearing surface side of said write gap layer being sandwiched between said upper magnetic layer and said lower magnetic layer;
   a write coil layer formed to pass through at least between said upper magnetic layer and said lower magnetic layer; and
   at least one non-magnetic layer that is a different layer from said write gap layer and formed in said upper magnetic layer, a whole area of an upper surface, a whole area of a lower surface, a whole area of a front surface and at least a portion of a rear surface of said non-magnetic layer being covered with magnetic material of said upper magnetic layer or said lower magnetic layer.

2. The thin-film magnetic head as claimed in claim 1, wherein at least surfaces other than both side surfaces of said non-magnetic layer are covered with magnetic material of said upper magnetic layer or said lower magnetic layer.

3. The thin-film magnetic head as claimed in claim 2, wherein said non-magnetic layer is wholly covered with magnetic material of said upper magnetic layer or said lower magnetic layer.

4. The thin-film magnetic head as claimed in claim 1, wherein a portion of said rear surface or portions of both side surfaces of said non-magnetic layer is connected to a non-magnetic region covering said upper magnetic layer.

5. The thin-film magnetic head as claimed in claim 4, wherein only a portion of said rear surface of said non-magnetic layer is connected to a non-magnetic region covering said upper magnetic layer.

6. The thin-film magnetic head as claimed in claim 5, wherein said upper magnetic layer has a gap in an end portion thereof on the side opposite to the air bearing surface, on a cross-section parallel to the element formation surface of said non-magnetic layer, and said upper magnetic layer surrounds said non-magnetic layer except said gap.

7. The thin-film magnetic head as claimed in claim 1, wherein said upper magnetic layer comprises; an upper magnetic pole layer whose lower surface is in contact with a surface of said write gap layer; a back-contact magnetic pole layer whose lower surface is in contact with a surface of said lower magnetic layer; and an upper yoke layer whose end portion on the air bearing surface side is in contact with a surface of said upper magnetic pole layer and whose end portion opposite to said end portion on the air bearing surface side is in contact with a surface of said back-contact magnetic pole layer, and said non-magnetic layer is provided within said back-contact magnetic pole layer.

8. The thin-film magnetic head as claimed in claim 7, wherein a thickness of the magnetic material portion covering said non-magnetic layer in the direction in-plane of the element formation surface, is set to be at least 1 micrometer or more.

9. The thin-film magnetic head as claimed in claim 1, wherein said upper magnetic layer comprises; an upper magnetic pole layer whose lower surface is in contact with a surface of said write gap layer; and an upper yoke layer whose end portion on the air bearing surface side is in contact with a surface of said upper magnetic pole layer, and said non-magnetic layer is provided within said upper yoke layer.

10. The thin-film magnetic head as claimed in claim 1, wherein said non-magnetic layer is formed of a non-magnetic and electrically insulating material.

11. A thin-film magnetic head including an electromagnetic coil element, said electromagnetic coil element comprising:
   a main magnetic pole layer formed on an element formation surface of a substrate having an air bearing surface;
   a back-contact magnetic pole layer, a lower surface of said back-contact magnetic pole layer being in contact with a surface of said main magnetic pole layer;
   a gap layer;
   an auxiliary magnetic pole layer, an end portion of said auxiliary magnetic pole layer on the air bearing surface side being opposed to an end portion on the air bearing surface side of said main magnetic pole layer through said gap layer, and an end portion opposite to said end portion on the air bearing surface side being in contact with a surface of said back-contact magnetic pole layer;
   a write coil layer formed to pass through at least between said main magnetic pole layer and said auxiliary magnetic pole layer; and
   at least one non-magnetic layer that is a different layer from said gap layer and formed in said back-contact magnetic pole layer or said main magnetic pole layer, a whole area of an upper surface, a whole area of a lower surface, a whole area of a front surface and at least a portion of a rear surface of said non-magnetic layer being covered with magnetic material of at least one of said main magnetic pole layer, said back-contact magnetic pole layer and said auxiliary magnetic pole layer.

12. The thin-film magnetic head as claimed in claim 11, wherein at least surfaces other than both side surfaces of said non-magnetic layer are covered with magnetic material of at least one of said main magnetic pole layer, said back-contact magnetic pole layer and said auxiliary magnetic pole layer.

13. The thin-film magnetic head as claimed in claim 12, wherein said non-magnetic layer is wholly covered with magnetic material of at least one of said main magnetic pole layer, said back-contact magnetic pole layer and said auxiliary magnetic pole layer.

14. The thin-film magnetic head as claimed in claim 11, wherein a portion of said rear surface or portions of both side surfaces of said non-magnetic layer is connected to a non-magnetic region covering said main magnetic pole layer or said back-contact magnetic pole layer.

15. The thin-film magnetic head as claimed in claim 14, wherein only a portion of said rear surface of said non-magnetic layer is connected to a non-magnetic region covering said main magnetic pole layer or said back-contact magnetic pole layer.

16. The thin-film magnetic head as claimed in claim 15, wherein said main magnetic pole layer or said back-contact magnetic pole layer has a gap in an end portion thereof on the side opposite to the air bearing surface, on a cross-section parallel to the element formation surface of said non-magnetic layer, and said main magnetic pole layer or said back-contact magnetic pole layer surrounds said non-magnetic layer except said gap.

17. The thin-film magnetic head as claimed in claim 11, wherein said non-magnetic layer is formed of a non-magnetic and electrically insulating material.

18. A head gimbal assembly including a thin-film magnetic head and a support mechanism for supporting said thin-film magnetic head, said thin-film magnetic head including an electromagnetic coil element, said electromagnetic coil element comprising:
 an upper magnetic layer and a lower magnetic layer, formed on an element formation surface of a substrate having an air bearing surface;
 a write gap layer, an end portion on the air bearing surface side of said write gap layer being sandwiched between said upper magnetic layer and said lower magnetic layer;
 a write coil layer formed to pass through at least between said upper magnetic layer and said lower magnetic layer; and
 at least one non-magnetic layer that is a different layer from said write gap layer and formed in said upper magnetic layer, a whole area of an upper surface, a whole area of a lower surface, a whole area of a front surface and at least a portion of a rear surface of said non-magnetic layer being covered with magnetic material of said upper magnetic layer or said lower magnetic layer.

19. The head gimbal assembly as claimed in claim 18, wherein at least surfaces other than both side surfaces of said non-magnetic layer are covered with magnetic material of said upper magnetic layer or said lower magnetic layer.

20. The head gimbal assembly as claimed in claim 19, wherein said non-magnetic layer is wholly covered with magnetic material of said upper magnetic layer or said lower magnetic layer.

21. The head gimbal assembly as claimed in claim 18, wherein said upper magnetic layer comprises; an upper magnetic pole layer whose lower surface is in contact with a surface of said write gap layer; a back-contact magnetic pole layer whose lower surface is in contact with a surface of said lower magnetic layer; and an upper yoke layer whose end portion on the air bearing surface side is in contact with a surface of said upper magnetic pole layer and whose end portion opposite to said end portion on the air bearing surface side is in contact with a surface of said back-contact magnetic pole layer, and said non-magnetic layer is provided within said back-contact magnetic pole layer.

22. The head gimbal assembly as claimed in claim 21, wherein a thickness of the magnetic material portion covering said non-magnetic layer in the direction in-plane of the element formation surface, is set to be at least 1 micrometer or more.

23. A head gimbal assembly including a thin-film magnetic head and a support mechanism for supporting said thin-film magnetic head, said thin-film magnetic head including an electromagnetic coil element, said electromagnetic coil element comprising:
 a main magnetic pole layer formed on an element formation surface of a substrate having an air bearing surface;
 a back-contact magnetic pole layer, a lower surface of said back-contact magnetic pole layer being in contact with a surface of said main magnetic pole layer;
 a gap layer;
 an auxiliary magnetic pole layer, an end portion of said auxiliary magnetic pole layer on the air bearing surface side being opposed to an end portion on the air bearing surface side of said main magnetic pole layer through said gap layer, and an end portion opposite to said end portion on the air bearing surface side being in contact with a surface of said back-contact magnetic pole layer;
 a write coil layer formed to pass through at least between said main magnetic pole layer and said auxiliary magnetic pole layer; and
 at least one non-magnetic layer that is a different layer from said gap and formed in said back-contact magnetic pole layer or said main magnetic pole layer, a whole area of an upper surface, a whole area of a lower surface, a whole area of a front surface and at least a portion of a rear surface of said non-magnetic layer being covered with magnetic material of at least one of said main magnetic pole layer, said back-contact magnetic pole layer and said auxiliary magnetic pole layer.

24. The head gimbal assembly as claimed in claim 23, wherein at least surfaces other than both side surfaces of said non-magnetic layer are covered with magnetic material of at least one of said main magnetic pole layer, said back-contact magnetic pole layer and said auxiliary magnetic pole layer.

25. The head gimbal assembly as claimed in claim 24, wherein said non-magnetic layer is wholly covered with magnetic material of at least one of said main magnetic pole layer, said back-contact magnetic pole layer and said auxiliary magnetic pole layer.

26. A magnetic disk drive apparatus including:
 at least one head gimbal assembly including a thin-film magnetic head and a support mechanism for supporting said thin-film magnetic head;
 at least one magnetic recording medium; and
 a recording/reproducing means for controlling read and write operations of said thin-film magnetic head to said at least one magnetic recording medium,
 said thin-film magnetic head including an electromagnetic coil element, said electromagnetic coil element comprising:
 an upper magnetic layer and a lower magnetic layer, formed on an element formation surface of a substrate having an air bearing surface;
 a write gap layer, an end portion on the air bearing surface side of said write gap layer being sandwiched between said upper magnetic layer and said lower magnetic layer; and
 a write coil layer formed to pass through at least between said upper magnetic layer and said lower magnetic layer; and
 at least one non-magnetic layer that is a different layer from said write gap layer and formed in said upper magnetic layer, a whole area of an upper surface, a whole area of a lower surface, a whole area of a front surface and at least a portion of a rear surface of said non-magnetic layer being covered with magnetic material of said upper magnetic layer or said lower magnetic layer.

27. The magnetic disk drive apparatus as claimed in claim 26, wherein at least surfaces other than both side surfaces of said non-magnetic layer are covered with magnetic material of said upper magnetic layer or said lower magnetic layer.

28. The magnetic disk drive apparatus as claimed in claim 27, wherein said non-magnetic layer is wholly covered with magnetic material of said upper magnetic layer or said lower magnetic layer.

29. The magnetic disk drive apparatus as claimed in claim 26, wherein said upper magnetic layer comprises; an upper magnetic pole layer whose lower surface is in contact with a surface of said write gap layer; a back-contact magnetic pole layer whose lower surface is in contact with a surface of said lower magnetic layer; and an upper yoke layer whose end portion on the air bearing surface side is in contact with a surface of said upper magnetic pole layer and whose end portion opposite to said end portion on the air bearing surface side is in contact with a surface of said back-contact magnetic pole layer, and said non-magnetic layer is provided within said back-contact magnetic pole layer.

30. The magnetic disk drive apparatus as claimed in claim 29, wherein a thickness of the magnetic material portion covering said non-magnetic layer in the direction in-plane of the element formation surface, is set to be at least 1 micrometer or more.

31. A magnetic disk drive apparatus including:
at least one head gimbal assembly including a thin-film magnetic head and a support mechanism for supporting said thin-film magnetic head;
at least one magnetic recording medium; and
a recording/reproducing means for controlling read and write operations of said thin-film magnetic head to said at least one magnetic recording medium, said thin-film magnetic head including an electromagnetic coil element, said electromagnetic coil element comprising:
a main magnetic pole layer formed on an element formation surface of a substrate having an air bearing surface;
a back-contact magnetic pole layer, a lower surface of said back-contact magnetic pole layer being in contact with a surface of said main magnetic pole layer;
a gap layer;
an auxiliary magnetic pole layer, an end portion of said auxiliary magnetic pole layer on the air bearing surface side being opposed to an end portion on the air bearing surface side of said main magnetic pole layer through said gap layer, and an end portion opposite to said end portion on the air bearing surface side being in contact with a surface of said back-contact magnetic pole layer;
a write coil layer formed to pass through at least between said main magnetic pole layer and said auxiliary magnetic pole layer; and
at least one non-magnetic layer that is a different layer from said gap layer and formed in said back-contact magnetic pole layer or said main magnetic pole layer, a whole area of an upper surface, a whole area of a lower surface, a whole area of a front surface and at least a portion of a rear surface of said non-magnetic layer being covered with magnetic material of at least one of said main magnetic pole layer, said back-contact magnetic pole layer and said auxiliary magnetic pole layer.

32. The magnetic disk drive apparatus as claimed in claim 31, wherein at least surfaces other than both side surfaces of said non-magnetic layer are covered with magnetic material of at least one of said main magnetic pole layer, said back-contact magnetic pole layer and said auxiliary magnetic pole layer.

33. The magnetic disk drive apparatus as claimed in claim 32, wherein said non-magnetic layer is wholly covered with magnetic material of at least one of said main magnetic pole layer, said back-contact magnetic pole layer and said auxiliary magnetic pole layer.

* * * * *